United States Patent [19]

Ueda et al.

[11] Patent Number: 5,019,989

[45] Date of Patent: May 28, 1991

[54] VEHICLE ENGINE OUTPUT CONTROL METHOD AND APPARATUS

[75] Inventors: Katsunori Ueda; Makoto Shimada; Yoshiaki Danno, all of Kyoto; Kazuhide Togai, Takatsuki; Masato Yoshida, Kyoto, all of Japan

[73] Assignee: Mitsubishi Jidosha Kogyo Kabushiki Kaisha, Tokyo, Japan

[21] Appl. No.: 441,777

[22] Filed: Nov. 27, 1989

[30] Foreign Application Priority Data

Dec. 1, 1988 [JP] Japan .................. 63-304797
Dec. 1, 1988 [JP] Japan .................. 63-304799
Dec. 15, 1988 [JP] Japan .................. 63-317418

[51] Int. Cl.$^5$ .............. G06F 15/48; G06F 15/50; G06G 7/70; F02D 23/00
[52] U.S. Cl. .............. 364/431.05; 364/426.03; 123/486; 123/564; 60/601
[58] Field of Search .............. 364/426.01, 426.02, 364/431.04, 431.05, 426.03; 123/480, 486, 564; 60/601–603

[56] References Cited

U.S. PATENT DOCUMENTS

| | | | |
|---|---|---|---|
| 3,938,611 | 2/1976 | Bertolasi | 364/426.03 X |
| 4,352,158 | 9/1982 | Date et al. | 364/431.05 |
| 4,389,994 | 6/1983 | Denz et al. | 123/480 X |
| 4,470,390 | 9/1984 | Omori et al. | 364/431.04 X |
| 4,471,742 | 9/1984 | Kishi | 123/480 X |
| 4,736,814 | 4/1988 | Yogo et al. | 364/426.03 X |
| 4,768,608 | 7/1988 | Hrovat | . |
| 4,811,808 | 3/1989 | Matsumoto et al. | 364/426.01 X |

FOREIGN PATENT DOCUMENTS

| | | |
|---|---|---|
| 186122 | 2/1986 | European Pat. Off. . |
| 55-164761 | 5/1980 | Japan . |
| 61-79833 | 4/1986 | Japan . |
| 61-129434 | 10/1986 | Japan . |
| 62-103431 | 6/1987 | Japan . |
| 63-31860 | 2/1988 | Japan . |
| 63-038742 | 7/1988 | Japan . |

Primary Examiner—Parshotam S. Lall
Assistant Examiner—Edward Pipala
Attorney, Agent, or Firm—Hedman, Gibson, Costigan & Hoare, P.C.

[57] ABSTRACT

A slip value of a driving wheel is calculated on the basis of driving and driven wheel velocities detected by wheel velocity sensors. A target engine output of a vehicle is set in accordance with the slip value of the driving wheel. A target fuel amount to the engine is set in accordance with the target engine output. A target opening of a throttle valve is set based on the target fuel amount. An opening correction value of the throttle valve is calculated in accordance with a deviation between the target fuel amount and an actual fuel amount to the engine detected by a fuel controller. A traction controller controls to cause the engine output to coincide with the target engine output by ontrolling the opening of the throttle valve to attain an opening as a sum of the target opening and the opening correction value.

28 Claims, 23 Drawing Sheets

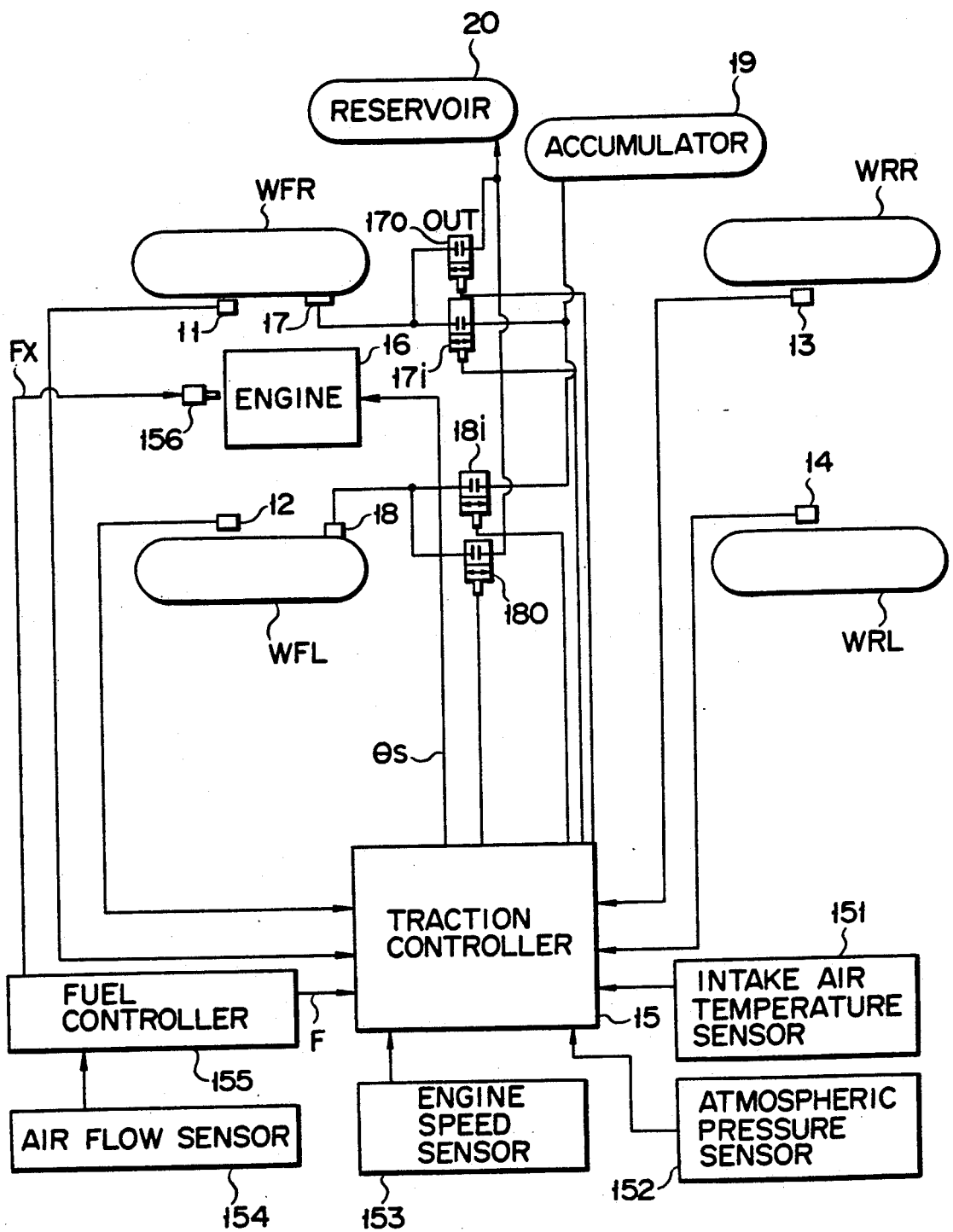
F I G. 1A

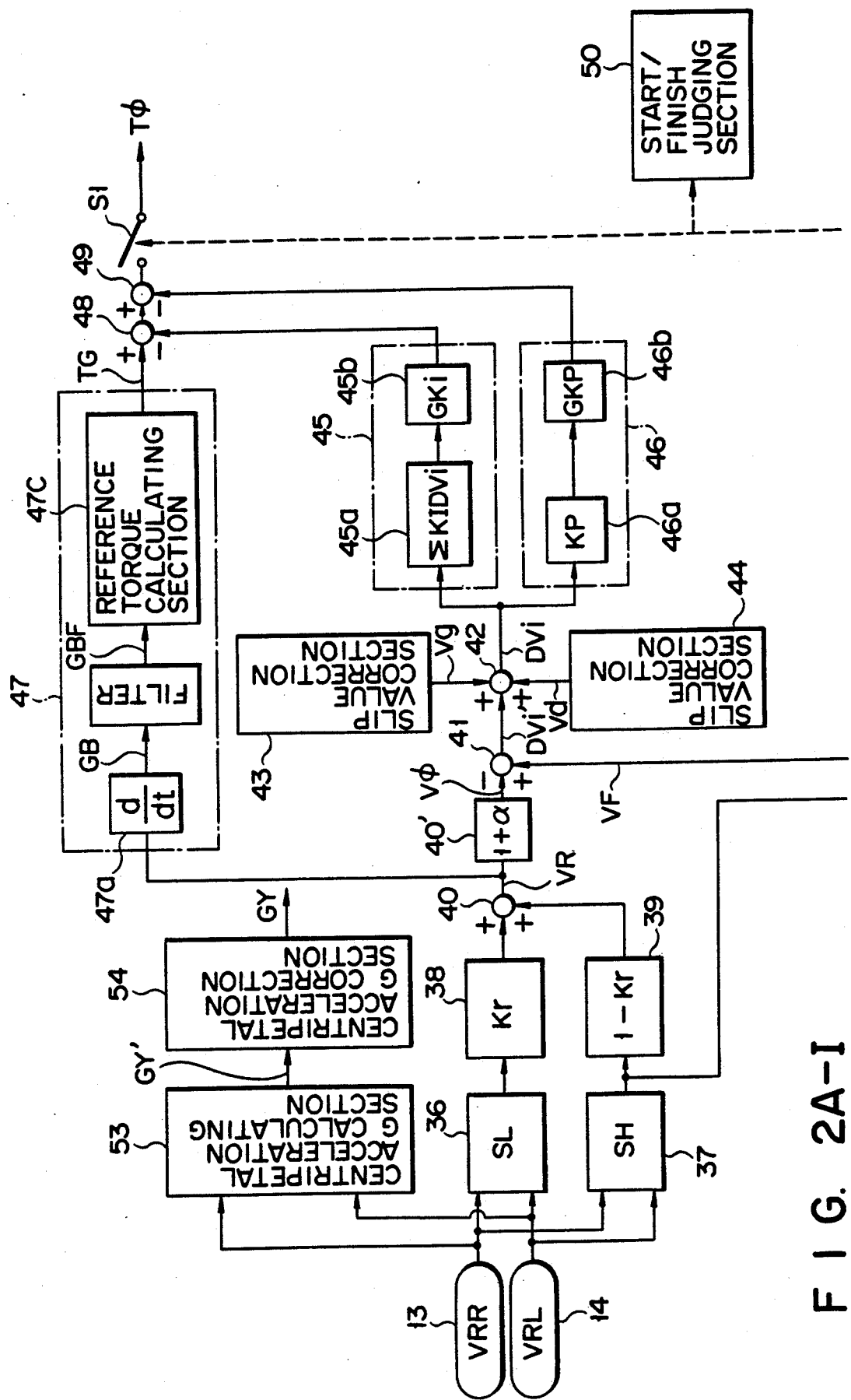
FIG. 2A-I

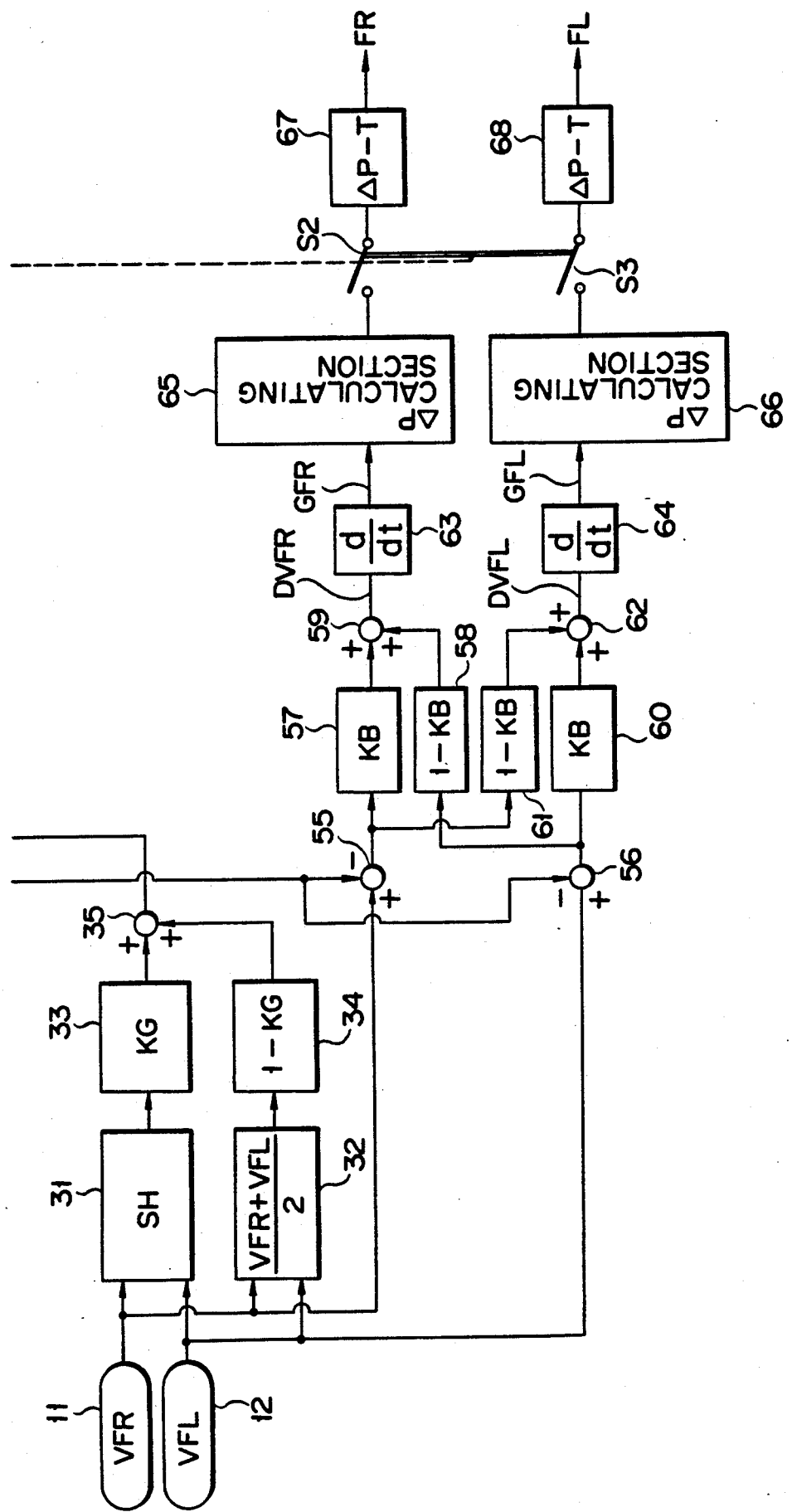
FIG. 2A-II

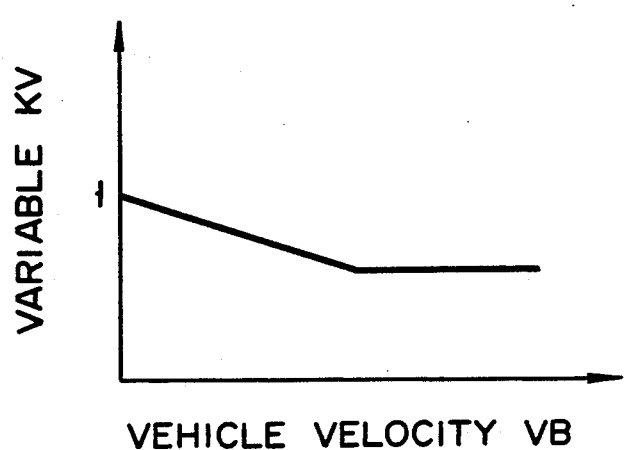
F I G. 7
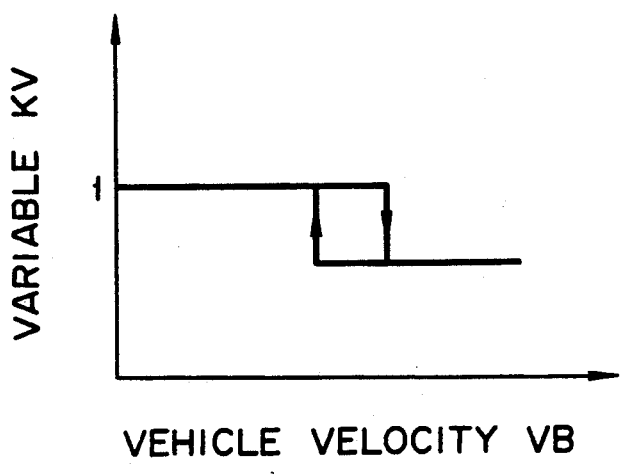
F I G. 8
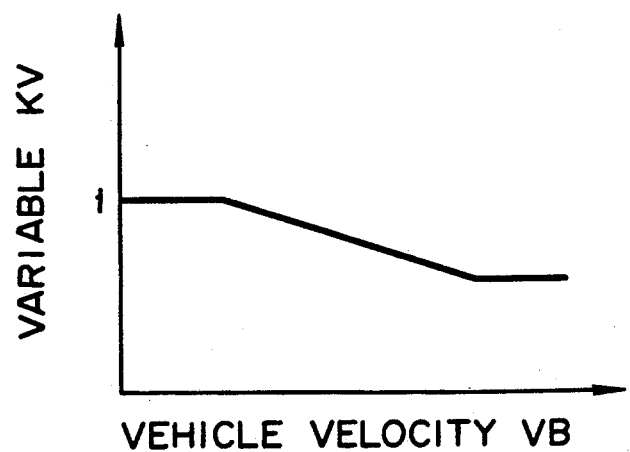
F I G. 9

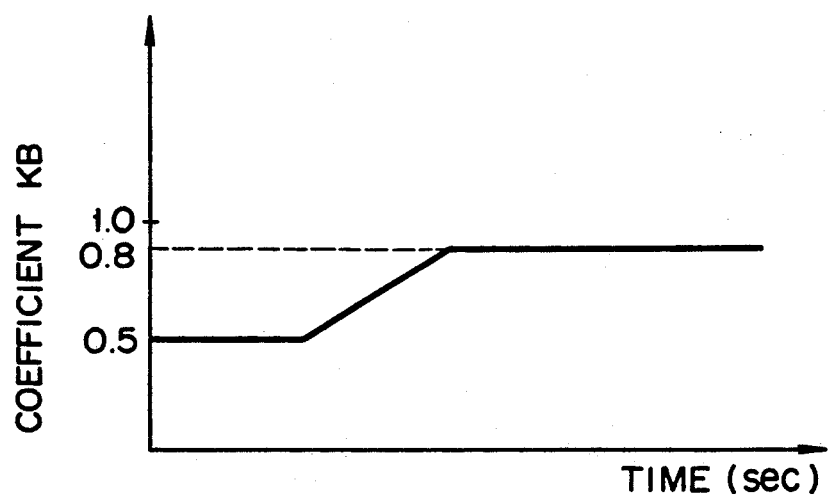
F I G. 13
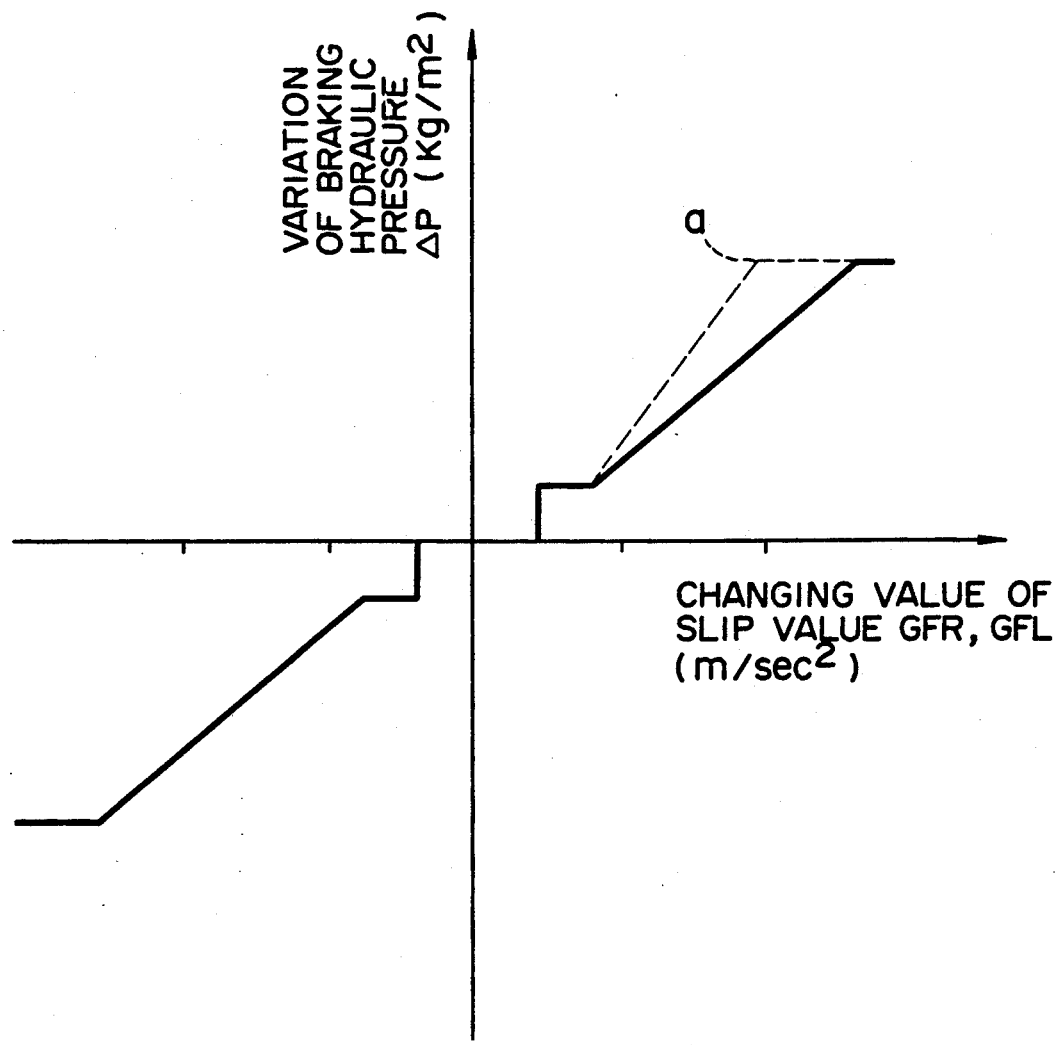
F I G. 14

| | ENGINE SPEED Ne |
|---|---|
| TARGET ENGINE TORQUE Tet | Ft |
F I G. 20
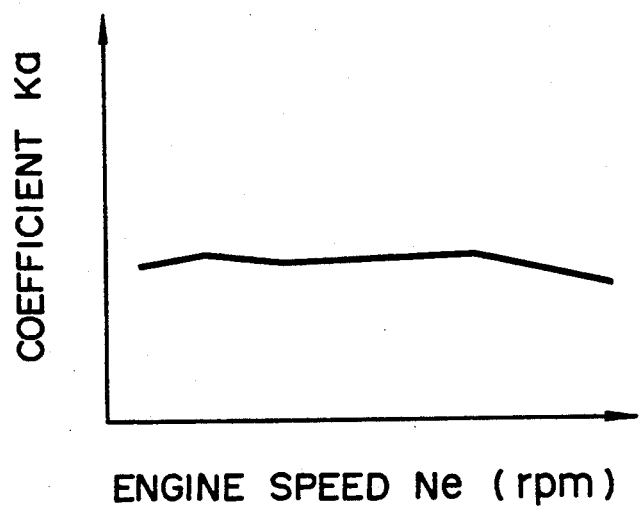
F I G. 21

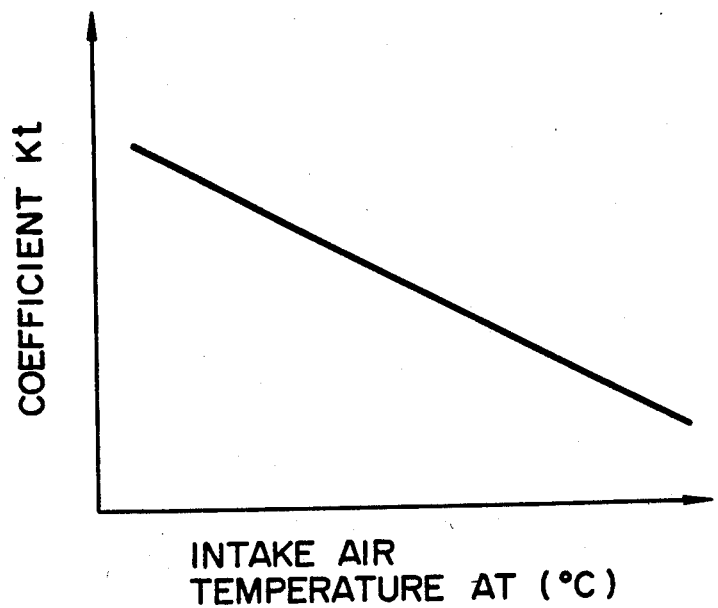
F I G. 22
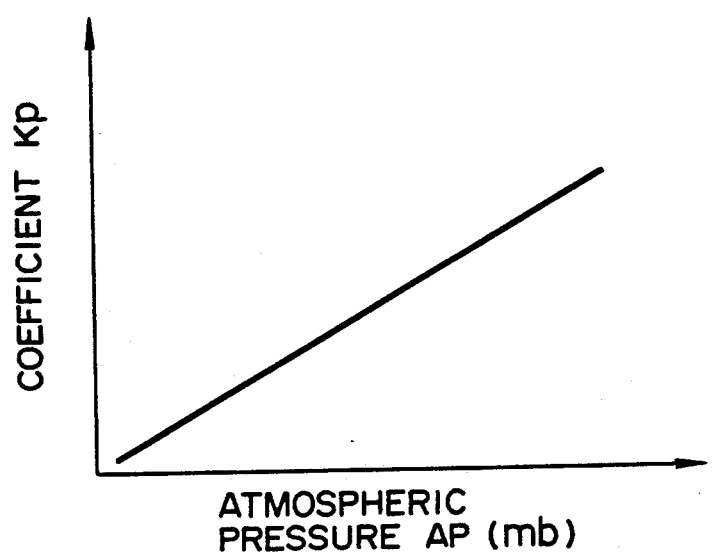
F I G. 23
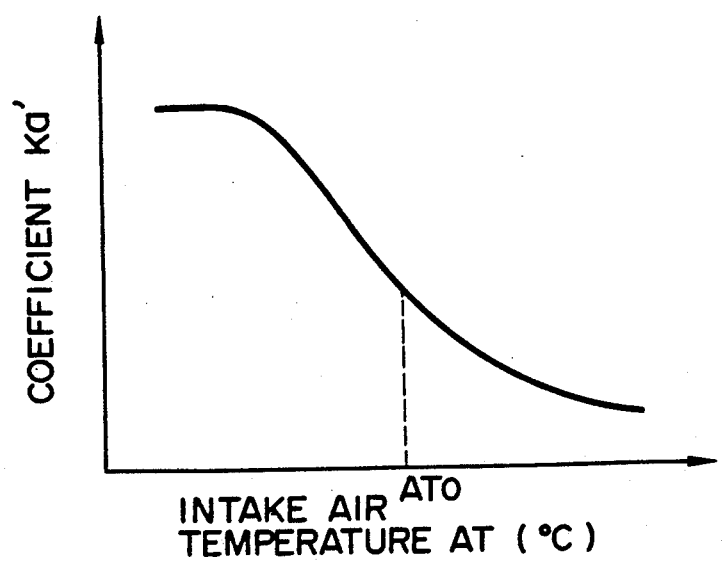
F I G. 24

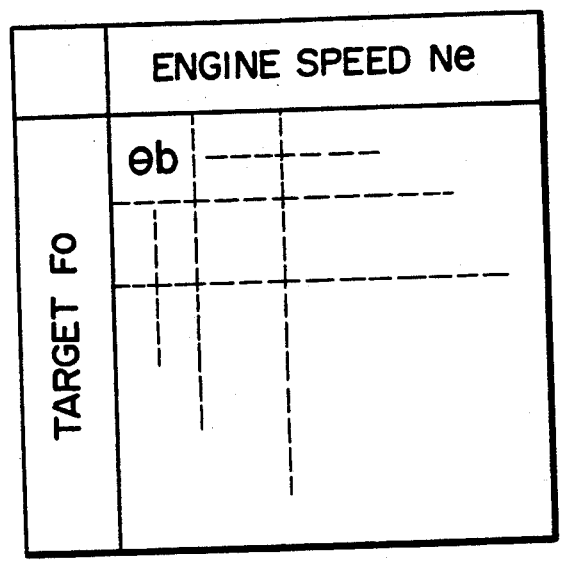
F I G. 25
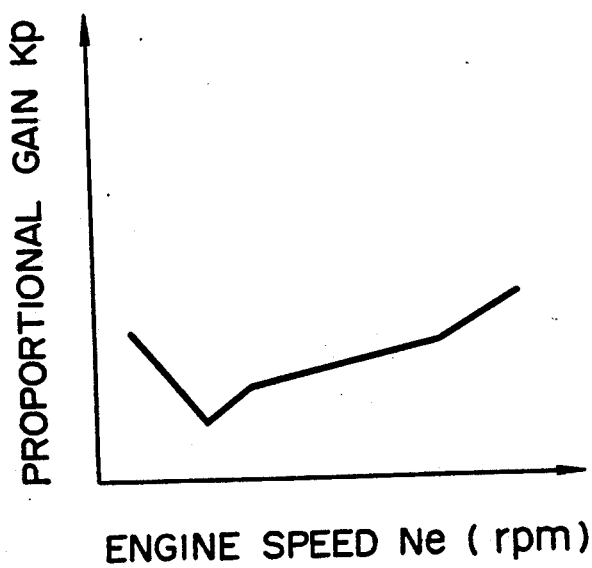
F I G. 26

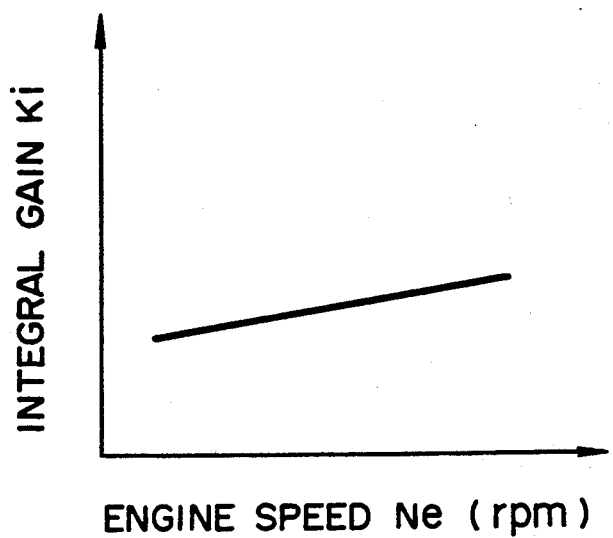
F I G. 27
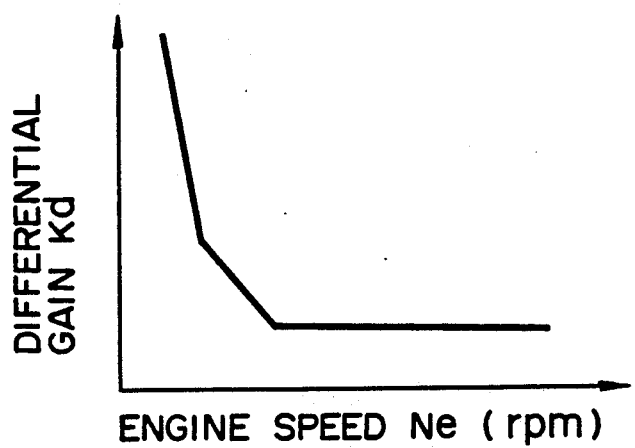
F I G. 28
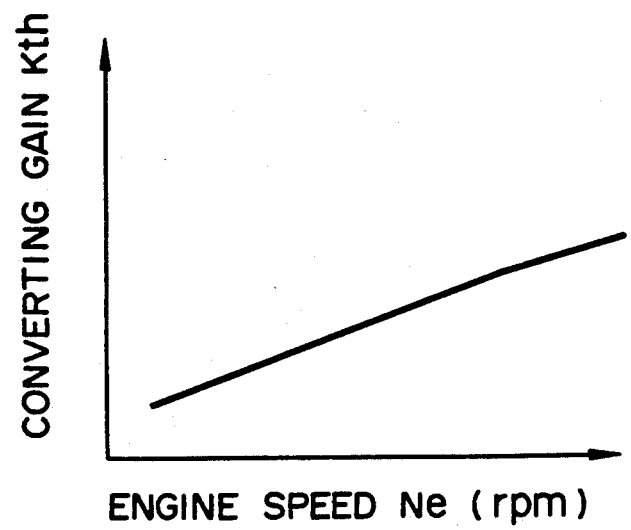
F I G. 29

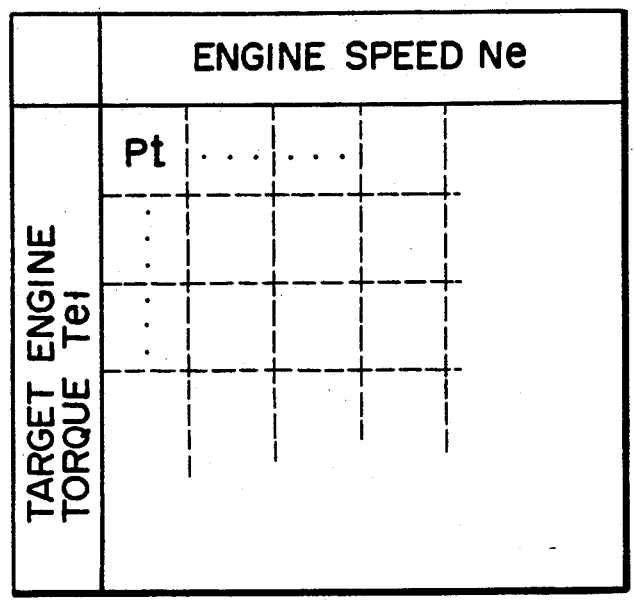
F I G. 33
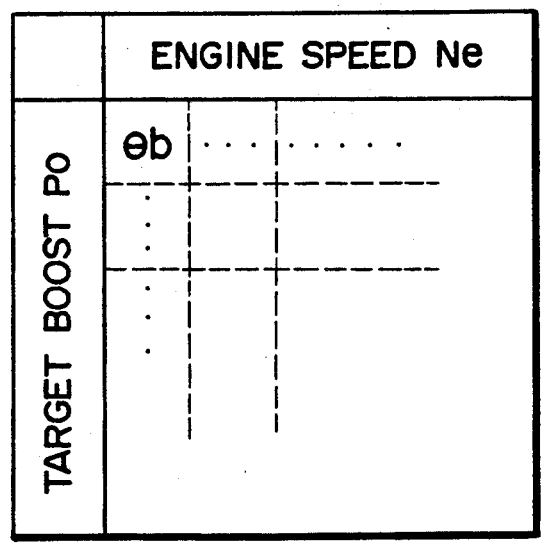
F I G. 34

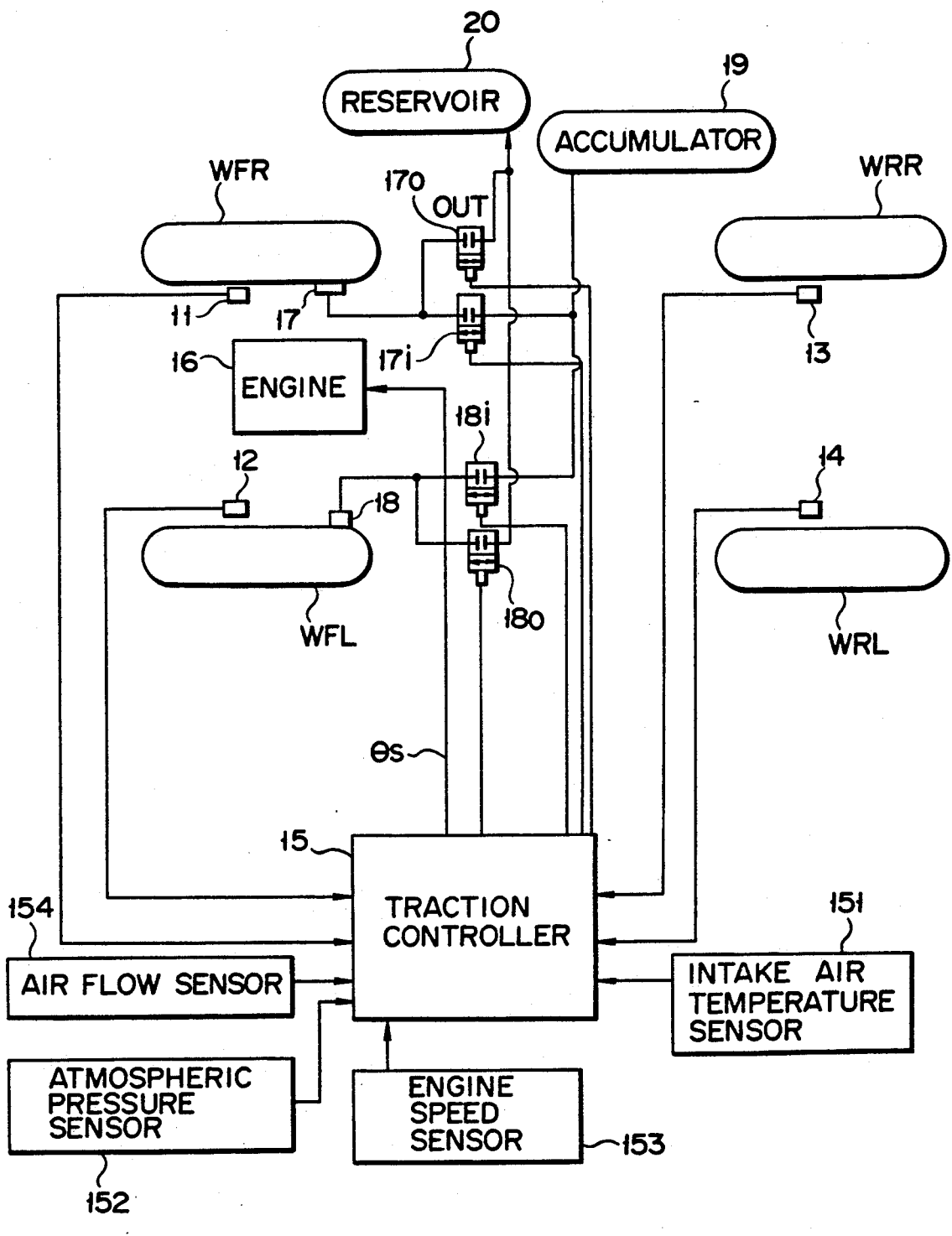
F I G. 35

F I G. 37

F I G. 38

VEHICLE ENGINE OUTPUT CONTROL METHOD AND APPARATUS

BACKGROUND OF THE INVENTION

1. Field of the Invention

The present invention relates to a vehicle engine output control method and apparatus adopted when an engine output of a vehicle is controlled to a target engine output.

2. Description of the Related Art

A traction control apparatus is well known as one of control apparatus which control an engine output of a vehicle. In the traction control apparatus, when an acceleration slip of the driving wheels is detected, a slip rate S is controlled to cause a coefficient $\mu$ of friction between the wheels and a road surface to fall within a maximum range (a hatched range in FIG. 18). The slip rate S is given by $[(VF-VB)/VF] \cdot 100$ (%), where VF is the wheel velocity of driving wheels, and VB is the vehicle velocity. More specifically, when a slip of driving wheels is detected, an engine output is controlled to cause the slip rate S to fall within the hatched range, thereby controlling the coefficient $\mu$ of friction between wheels and a road surface to fall within the maximum range. Thus, an acceleration slip of driving wheels is prevented to improve acceleration characteristics of a vehicle.

SUMMARY OF THE INVENTION

It is an object of the present invention to provide a vehicle engine output control method and apparatus, which can precisely control an engine output to a target engine output.

According to the present invention, there is provided an engine output control method for a vehicle, comprising the steps of: setting a target output of an engine in accordance with an operation condition of a vehicle; converting the target output into a target fuel supply amount to the engine; converting the target fuel supply amount into a target opening of a throttle valve provided to a intake path of the engine; correcting the target opening in accordance with a deviation between an actual fuel supply amount to the engine and the target fuel supply amount; and open/close-controlling the throttle valve in accordance with the corrected target opening.

Furthermore, according to the present invention, there is provided an engine output control apparatus for a vehicle, comprising: operation condition detecting means for detecting an operation condition of the vehicle; target output setting means for setting a target output of an engine of the vehicle in accordance with the detection result of the operation condition detecting means; fuel supplying means for supplying fuel to the engine; target fuel supply amount setting means for setting a target fuel supply amount to the engine in accordance with the target output set by the target output setting means; a throttle valve arranged in an intake path of the engine; target opening setting means for setting a target opening of the throttle valve on the basis of the target fuel supply amount set by the target fuel supply amount setting means; fuel supply controlling means for controlling the fuel supplying means; fuel supply amount detecting means for detecting an actual fuel supply amount to the engine; fuel supply amount deviation calculating means for calculating a deviation between the target fuel supply amount set by the target fuel supply amount setting means and the actual fuel supply amount detected by the fuel supply amount detecting means; opening correction value setting means for setting an opening correction value of the target opening set by the target opening setting means in accordance with the deviation calculated by the fuel supply amount deviation calculating means; and throttle valve controlling means for open/close-controlling the throttle valve in accordance with the target opening set by the target opening setting means and the opening correction value set by the opening correction value setting means.

According to the present invention, since a target throttle opening is calculated after a target engine output is converted to a target fuel amount, even if an atmospheric pressure or an air density changes, a proper target throttle opening can be obtained by correcting the target fuel amount in accordance with the atmospheric pressure or the air density. The engine output varies in accordance with the throttle opening. This is because an intake air amount varies in accordance with the throttle opening and then the fuel amount is calculated on the basis of the intake air amount. The fuel amount influences directly the engine output. Since the amount of a fuel, which directly influences an engine output, is feedback-controlled to control the fuel amount to be equal to the target fuel amount, a vehicle engine output control method and apparatus which can improve engine output control precision can be provided.

BRIEF DESCRIPTION OF THE DRAWINGS

FIG. 1A is a block diagram showing the overall arrangement of an engine output control apparatus to which an engine output control method according to the first embodiment of the present invention is applied;

FIGS. 2A-I, 2A-II and 2B are block diagrams showing control functions of a traction controller shown in FIG. 1 in units of functional blocks;

FIGS. 7 to 12 are graphs respectively showing the relationship between a vehicle velocity VB and a variable Kv;

FIG. 13 is a graph showing a change in variable KB as a function of time from the beginning of brake control;

FIG. 14 is a graph showing the relationship between a changing value GFR (GFL) of the slip value and a variation $\Delta P$ of a braking hydraulic pressure;

FIG. 20 shows a target engine torque-engine speed map;

FIG. 21 is a graph showing a coefficient Ka as a function of an engine speed Ne;

FIG. 22 is a graph showing a coefficient Kt as a function of an intake air temperature;

FIG. 23 is a graph showing a coefficient Kp as a function of an atmospheric pressure;

FIG. 24 is a graph showing a coefficient Ka' as a function of an intake air temperature;

FIG. 25 shows a map of an equivalent target throttle opening $\theta b$ with respect to an engine speed Ne and a target fuel amount F0;

FIG. 26 is a graph showing a proportional gain Kp as a function of an engine speed;

FIG. 27 is a graph showing an integral gain Ki as a function of an engine speed;

FIG. 28 is a graph showing a differential gain Kd as a function of an engine speed;

FIG. 29 is a graph showing a converting gain Kth as a function of an engine speed;

FIG. 33 shows a target engine torque-engine speed map;

FIG. 34 shows a map of an equivalent target throttle opening $\theta b$ with respect to an engine speed Ne and a target boost pressure P0;

FIG. 35 is a block diagram showing the overall arrangement of an engine output control apparatus to which an engine output control method according to the third embodiment of the present invention is applied;

FIG. 37 shows a target engine torque-engine speed map; and

FIG. 38 shows a target A/N-engine speed map.

DETAILED DESCRIPTION OF THE PREFERRED EMBODIMENTS

Figure 1B:
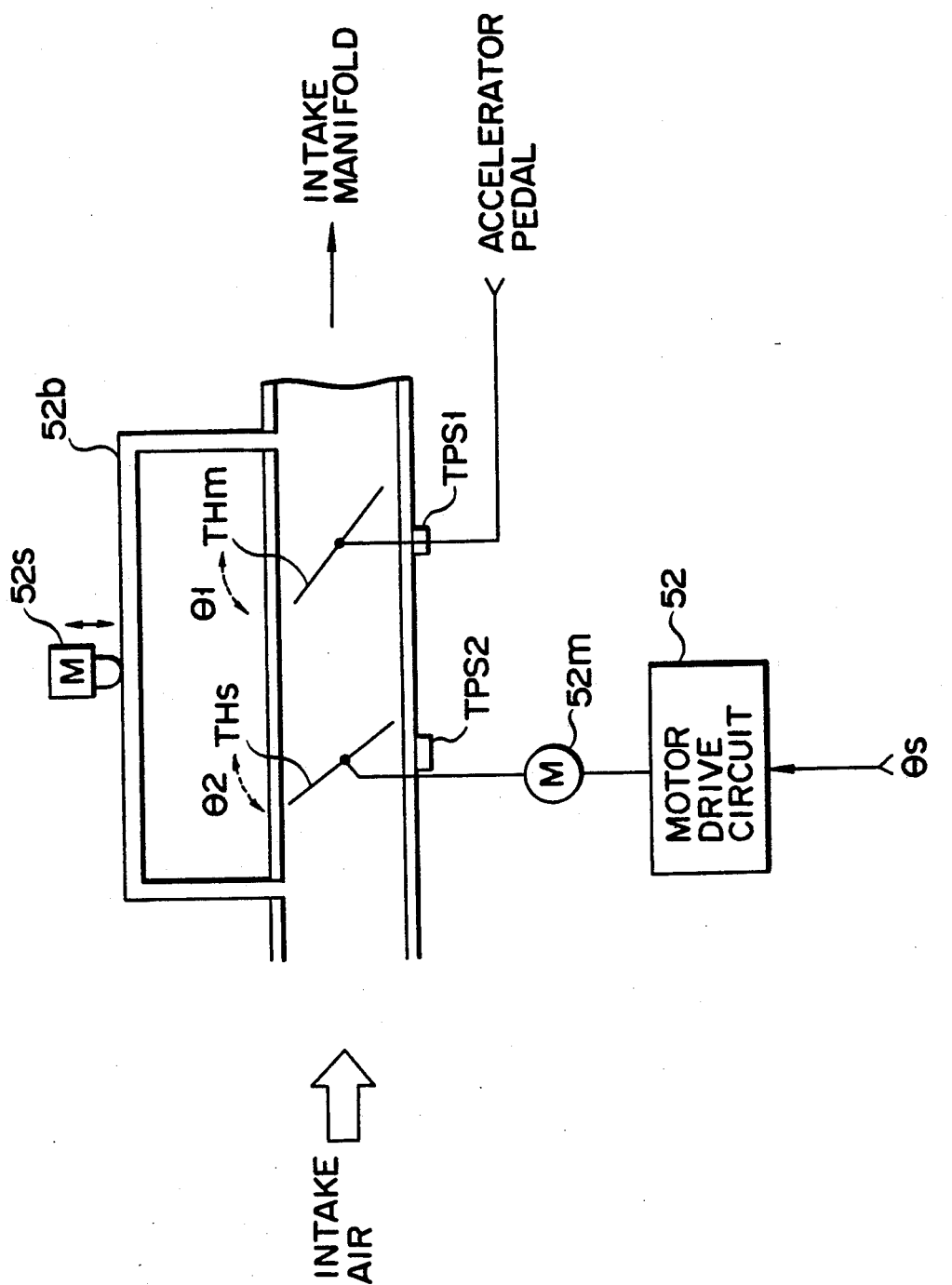
FIG. 1B is a diagram showing arrangements of main and sub throttle valves.

A vehicle engine output control method and apparatus according to the first embodiment of the present invention will now be described with reference to the accompanying drawings. FIG. 1A is a block diagram showing an acceleration slip preventing apparatus for a vehicle, which adopts a vehicle engine output control method according to the first embodiment of the present invention. FIG. 1A exemplifies a front-drive vehicle, and reference symbol WFR denotes a front right wheel; WFL, a front left wheel; WRR; a rear right wheel; and WRL, a rear left wheel. Reference numeral 11 denotes a wheel velocity sensor for detecting a wheel velocity VFR of the front right wheel (driving wheel) WFR; 12, a wheel velocity sensor for detecting a wheel velocity VFL of the front left wheel (driving wheel) WFL; 13, a wheel velocity sensor for detecting a wheel velocity VRR of the rear right wheel (driven wheel) WRR; and 14, a wheel velocity sensor for detecting a wheel velocity VRL of the rear left wheel (driven wheel) WRL. The wheel velocities VFR, VFL, VRR and VRL detected by the wheel velocity sensors 11 to 14 are input to a traction controller 15. The traction controller 15 receives intake air temperature data detected by an intake air temperature sensor 151, atmospheric pressure data detected by an atmospheric pressure sensor 152, and engine speed data Ne detected by an engine speed sensor 153. Reference numeral 154 denotes an air flow sensor for detecting an intake air amount A/N per engine revolution cycle. Note that the intake air amount per engine revolution cycle means an intake air amount taken into an engine until one cycle is completed. In this case, one cycle is defined upon completion of intake, compression, combustion, and exhaust steps. Therefore, for a 4-cycle engine, since engine makes two revolutions until one cycle is completed, an intake air amount per engine revolution cycle means an air amount taken into an engine during two revolutions of the engine.

The intake air amount A/N per engine revolution cycle detected by the air flow sensor 154 is input to a fuel controller 155. The fuel controller 155 sets a proper fuel amount F necessary for the intake air amount A/N per engine revolution cycle. The fuel amount F set by the fuel controller 155 is input to the controller 15. The fuel controller 155 also outputs a fuel control signal Fx to a fuel injection valve 156 for controlling a fuel amount to each cylinder of an engine 16.

The traction controller 15 sends a control signal to the engine 16 to control the engine to prevent a slip of the driving wheels in an acceleration state. The traction controller 15 comprises, e.g., a microcomputer, and includes a memory, a calculating unit, a register, and the like.

As shown in FIG. 1B, the engine 16 has a main throttle valve THm whose opening $\theta 1$ is operated by an accelerator pedal, and a sub throttle valve THs whose opening $\theta 2$ is controlled by an opening signal $\theta s$ (to be described later) from the traction controller 15. The opening $\theta 2$ of the sub throttle valve THs is changed by controlling a rotation of a motor 52m by a motor drive circuit 52 in accordance with the opening signal $\theta s$ from the traction controller 15. When the opening $\theta 2$ of the sub throttle valve THs is controlled in this manner, the driving force of the engine 16 is controlled. Note that the openings of the main and sub throttle valves THm and THs are respectively detected by throttle position sensors TPS1 and TPS2. A bypass path 52b for assuring an intake air amount in an idling state is arranged between the upstream and downstream sides of the main and sub throttle valves THm and THs. The opening of the bypass path 52b is controlled by a stepper motor 52s.

The relationship between a target fuel amount and a target air amount will be described in detail below. An intake air amount per engine revolution cycle taken into the engine through the main and sub throttle valves THm and THs and the bypass path 52 is detected by the air flow sensor 154 provided to an air cleaner. The detected intake air amount per engine revolution cycle is sent to the fuel controller 155 to determine the fuel amount Ft per engine revolution cycle. Fuel according to the fuel amount Ft is injected from the fuel injection valve 156, and the engine 16 can provide an engine output according to the fuel amount Ft and the intake air amount per engine revolution cycle. More specifically, the fuel controller 155 calculates a fuel amount per engine revolution cycle on the basis of the intake air amount per engine revolution cycle. Therefore, if the fuel amount Ft per engine revolution cycle is detected, the intake air amount per engine revolution cycle taken into the engine at that time can be calculated. If an intake air amount is obtained, a target throttle opening $\theta2$ of the sub throttle valve THs can be obtained in consideration of an air amount via the bypass path 52b and the opening of the main throttle valve THm. In the first embodiment, the fuel amount Ft per engine revolution cycle necessary for obtaining a target engine torque Tel is calculated, and the target throttle opening $\theta2$ of the sub throttle valve THs is calculated while performing various corrections. In addition, the amount of a fuel actually injected into the engine, which directly influences an engine output, is feedback-controlled to control the throttle opening of the sub throttle valve THs so that the fuel amount is equal to the target fuel amount, thereby improving engine output control precision.

Reference numeral 17 denotes a wheel cylinder for braking the front right wheel WFR; and 18, a wheel cylinder for braking the front left wheel WFL. A pressurized oil is supplied to these wheel cylinders through a master cylinder and the like (not shown) upon operation of a brake pedal (not shown). During a traction control operation, a pressurized oil can be supplied via another path to be described below. A pressurized oil is supplied from an accumulator 19 to the wheel cylinder 17 through an inlet valve 17i, and is exhausted from the wheel cylinder 17 to a reservoir 20 through an outlet valve 17o. A pressurized oil is supplied from the accumulator 19 to the wheel cylinder 18 through an inlet valve 18i, and is exhausted from the wheel cylinder 18 to the reservoir 20 through an outlet valve 18o. The inlet valves 17i and 18i and the outlet valves 17o and 18o are opening/closing-controlled by the traction controller 15.

Figure 2B:
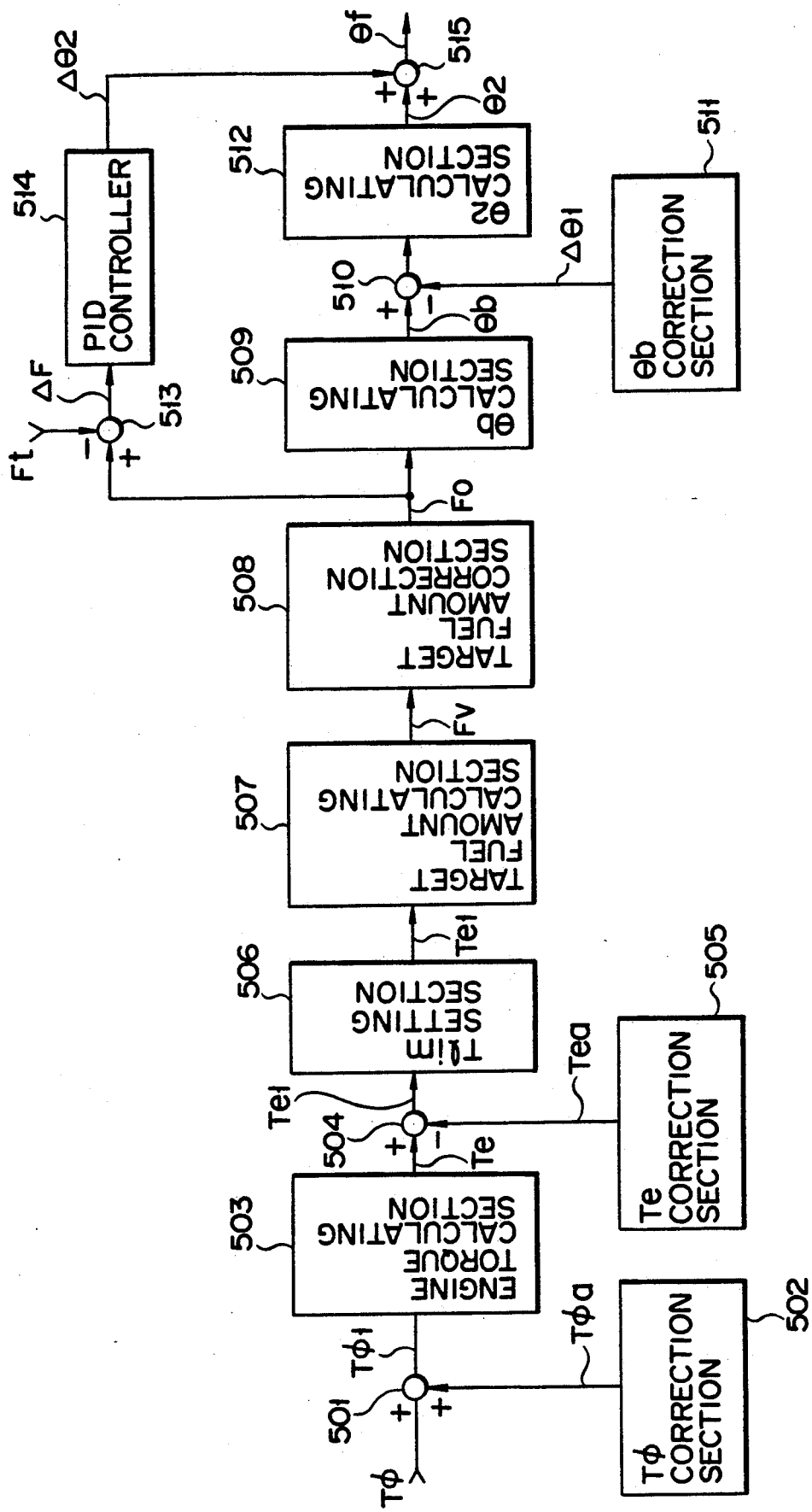
Figure 3:
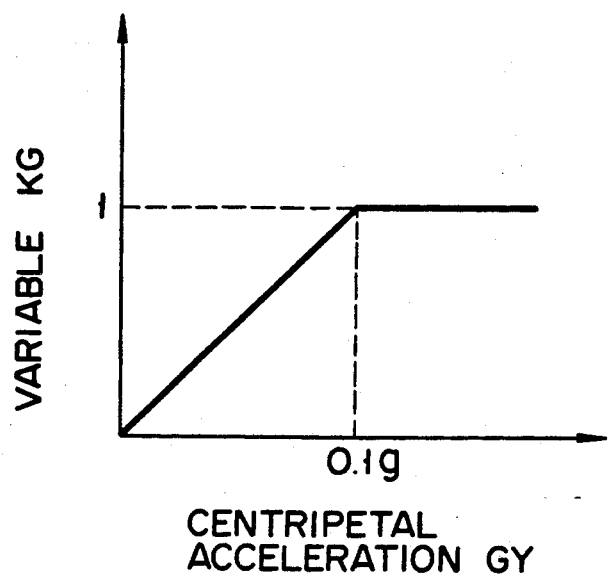
FIG. 3 is a graph showing the relationship between a centripetal acceleration GY and a variable KG.

The detailed arrangement of the traction controller 15 will be described below with reference to FIGS. 2A and 2B. The wheel velocities VFR and VFL of the driving wheels detected by the wheel velocity sensors 11 and 12 are supplied to a high-velocity selector (SH) 31, and a higher one of the wheel velocities VFR and VFL is selected and output. At the same time, the wheel velocities VFR and VFL of the driving wheels detected by the wheel speed sensors 11 and 12 are averaged by an averaging section 32 to calculate an average wheel velocity (VFR+VFL)/2. The wheel velocity output from the SH 31 is multiplied with a variable KG in a weighting section 33. The average wheel velocity output from the averaging section 32 is multiplied with a variable (1−KG) in a weighting section 34. The products output from the sections 33 and 34 are sent to an adder 35 to be added to each other, thus obtaining a driving wheel velocity VF. Note that the variable KG changes as a function of a centripetal acceleration GY, as shown in FIG. 3. As shown in FIG. 3, the variable KG is proportional to the centripetal acceleration GY up to a predetermined value of the centripetal acceleration (e.g., 0.1 g: g is a gravitational acceleration), and becomes "1" when the centripetal acceleration exceeds the predetermined value.

Figure 4:
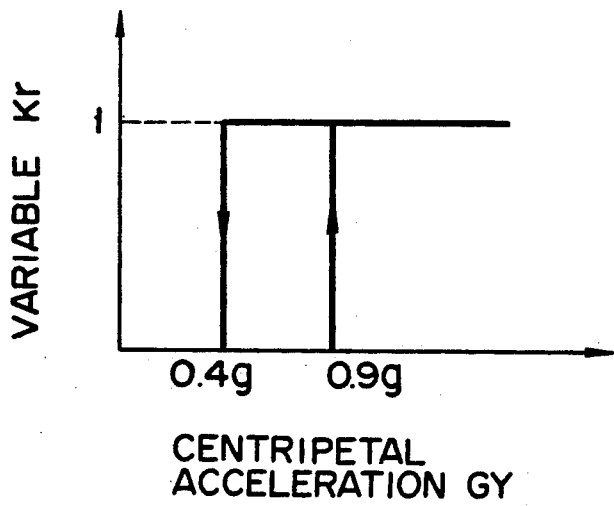
FIG. 4 is a graph showing the relationship between the centripetal acceleration GY and a variable Kr.

The wheel velocities of the driven wheels detected by the wheel velocity sensors 13 and 14 are input to a low-velocity selector (SL) 36, and a lower wheel velocity is selected. Furthermore, the wheel velocities of the driven wheels detected by the wheel velocity sensors 13 and 14 are input to an SH 37, and a higher wheel velocity i selected. The lower wheel velocity selected by the SL 36 is multiplied with a variable Kr in a weighting section 38, and a higher wheel velocity selected by the SH 37 is multiplied with a variable (1−Kr) in a weighting section 39. The variable Kr changes between "1" and "0" in accordance with the centripetal acceleration GY, as shown in FIG. 4.

The wheel velocities output from the weighting sections 38 and 39 are added to each other by an adder 40 to obtain a driven wheel velocity VR. The driven wheel velocity VR is multiplied with $(1+\alpha)$ by a multiplier 40', thus obtaining a target driving wheel velocity V$\phi$.

Figure 5:
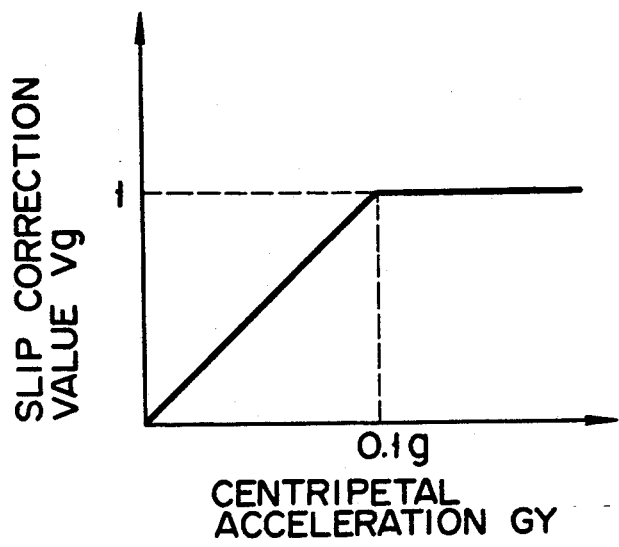
FIG. 5 is a graph showing the relationship between the centripetal acceleration GY and a slip correction value Vg.
Figure 6:
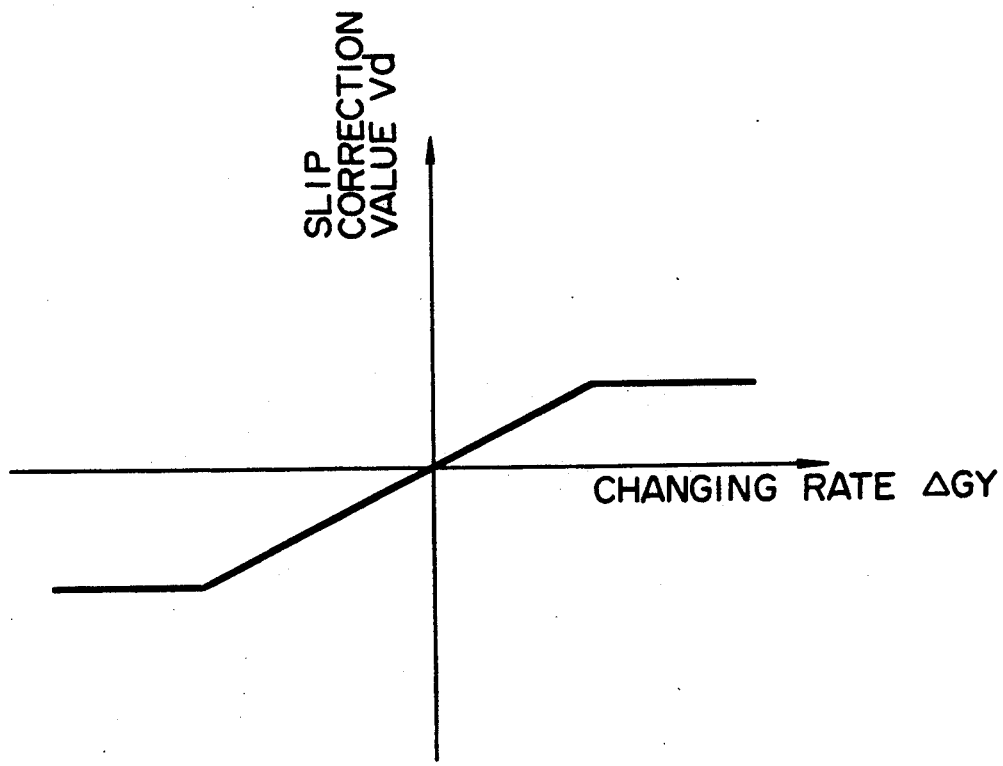
FIG. 6 is a graph showing the relationship between the centripetal acceleration GY and a slip correction value Vd.

The target driving wheel velocity V$\phi$ output from the multiplier 40' is subtracted from the driving wheel velocity VF output from the adder 35 by a subtractor 41 to calculate a slip value DVi' (=VF−V$\phi$). The slip value DVi' is corrected by an adder 42 in accordance with the centripetal acceleration GY and its changing rate $\Delta$GY. More specifically, a slip value correction section 43 is set with a slip correction value Vg which changes in accordance with the centripetal acceleration GY, as shown in FIG. 5, and a slip value correction section 44 is set with a slip correction value Vd which changes in accordance with the changing rate $\Delta$GY of the centripetal acceleration GY, as shown in FIG. 6. The adder 42 adds the slip value DVi' output from the subtractor 41 to the slip correction values Vd and Vg, thus obtaining a slip value DVi.

The slip value DVi is sent to a calculating section 45a of a TSn calculating unit 45 every 15-ms sampling times T, so that the slip values DVi are integrated while being multiplied with a coefficient KI, thereby calculating a correction torque TSn'. That is, a correction torque obtained by integrating the slip value DV, i.e., an integral correction torque TSn' is calculated as follows:

$$TSn' = \Sigma KI \cdot DVi$$

(KI is the coefficient which changes according to the slip value DVi). The integral correction torque TSn' is a correction value for a torque for driving the driving wheels WFR and WFL. Since a control gain must be adjusted in accordance with a change in characteristics of a power transmission mechanism between the engine 16 and the driving wheels upon switching of a transmission range, a coefficient multiplier 45b multiplies the correction torque with a coefficient GKi which differs in correspondence with a transmission range, thereby calculating an integral correction torque TSn corrected according to the transmission range.

The slip value DVi is sent to a calculating section 46a of a TPn calculating unit 46 at every sampling times T to calculate a correction torque TPn' proportional to the slip value DVi. That is, a correction torque proportional to the slip value DVi, i.e., a proportional correction torque TPn' is calculated as follows:

$$TPn' = DVi \cdot Kp$$

(where Kp is the coefficient). The proportional correction torque TPn' is multiplied with a coefficient GKp which varies depending on a transmission range by a coefficient multiplier 46b for the same reason as for the integral correction torque TSn', thereby calculating a proportional correction torque TPn corrected according to the transmission range.

The driven wheel velocity VR output from the adder 40 is input to a reference torque calculating section 47 as a vehicle velocity VB. Thus, a vehicle acceleration calculating section 47a in the reference torque calculating unit 47 calculates an acceleration V̇B(GB) of the vehicle velocity.

The vehicle acceleration V̇B(GB) calculated by the vehicle acceleration calculating section 47a is filtered through a filter 47b to obtain a vehicle acceleration GBF. In order to quickly shift control to control according to a state of a position "2" upon an increase in acceleration, the filter 47b averages $GBF_{n-1}$ as an immediately preceding output of the filter 47 and presently detected $GB_n$ with the same weight as follows:

$$GBF_n = (GB_n + GBF_{n-1})/2 \quad (1)$$

Figure 15:
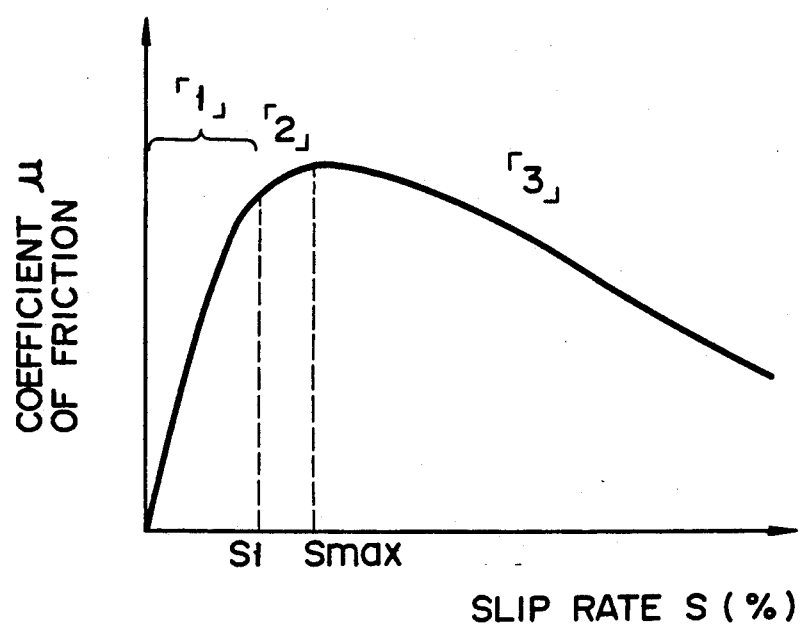
FIGS. 15 and 18 are graphs showing the relationship between a slip rate S and a coefficient $\mu$ of friction of a road surface.

When the present acceleration of the vehicle is decreasing and its slip rate S satisfies S>S1 and is shifted from a range "2" to "3" shown in FIG. 15, a response speed of the filter 47b is decreased to maintain control according to the state of the range "2" as much as possible, and the vehicle acceleration GBF is calculated as a vehicle acceleration $GBF_n$ having a value close to the immediately preceding output $GBF_{n-1}$ of the filter 47b by equation (2):

$$GBF_n = (GB_n + 7GBF_{n-1})/8 \quad (2)$$

Furthermore, when the present acceleration of the vehicle is decreasing and its slip rate S satisfies S≦S1 and is shifted from range "2" to "1" shown in FIG. 15, in order to maintain control according to the state of "2" to be longer than the case wherein the vehicle acceleration GBF is calculated by equation (2), the immediately preceding output $GBF_{n-1}$ of the filter 47b is further weighted, and the vehicle acceleration GBF is calculated as the vehicle acceleration $GBF_n$ having a value closer to the immediately preceding vehicle acceleration $GBF_{n-1}$ by equation (3) than the case wherein equation (2) is used:

$$GBF_n = (GB_n + 15GBF_{n-1})/16 \quad (3)$$

In this manner, the filter 47b is switched in three steps as given by equations (1) to (3) in accordance with a state of an acceleration. The vehicle acceleration GBF is supplied to a reference torque calculating section 47c, thus calculating a reference torque TG. That is, $$TG = GBF \cdot W \cdot Re$$

where W is the weight of the vehicle, and Re is the radius of the wheel.

The integral correction torque TSn is subtracted from the reference torque TG by a subtractor 48, and the proportional correction torque TPn is then subtracted from the difference by a subtractor 49. In this manner, a target torque Tφ is calculated by:

$$T\phi = TG - TSn - TPn$$

Figure 16:
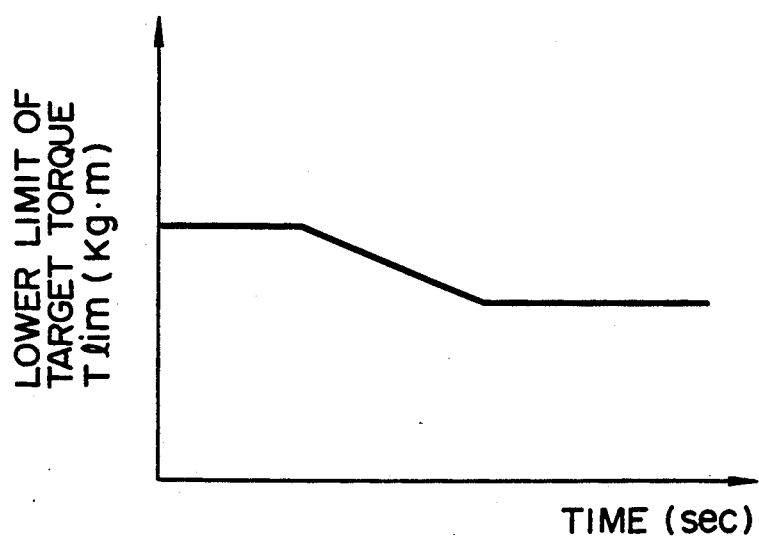
FIG. 16 is a graph showing Tlim-t characteristics.
Figure 17:
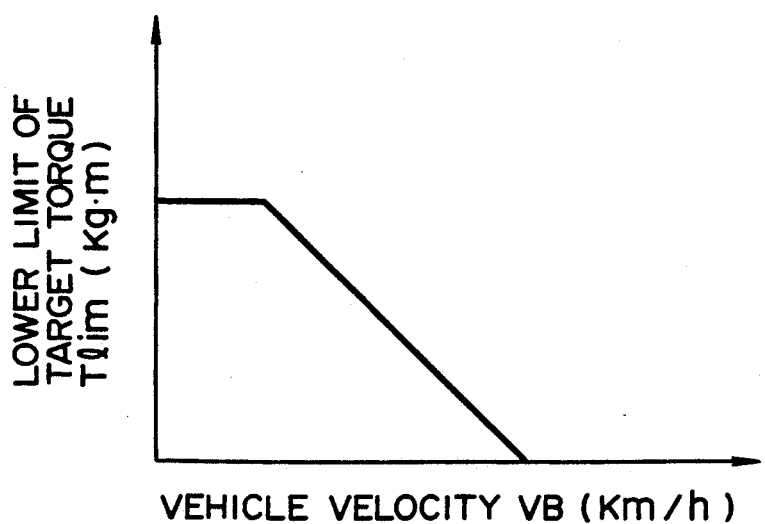
FIG. 17 is a graph showing Tlim-VB characteristics.

The target torque Tφ represents an axle torque for driving the driving wheels WFR and WFL. The axle torque Tφ is input to an adder 501 through a switch S1 which is turned on/off by a start/finish judging section 50 for judging the start/finish of traction control, so that the axle torque is corrected in accordance with a factor which influences the relationship between the axle torque Tφ and the engine torque, e.g., a cooling water temperature of the engine 16. The correction is performed by adding a correction value Tφa from a Tφ correction section 502 to the axle torque. The corrected axle torque Tφ1 output from the adder 501 is divided with a total gear ratio between the engine 16 and the drive axle by an engine torque calculating section 503 to be converted to a target engine torque Te. The target engine torque Te is added to a correction value Tea of the target engine torque Te caused by an atmospheric condition or the like from a Te correction section 505 by an adder 504. The corrected target engine torque Tel is limited to a value equal to or larger than a lower limit Tlim which changes as a function of elapse time t from the beginning of traction control or the vehicle velocity VB, as shown in FIG. 16 or 17, by a lower limit setting section 506 for setting the lower limit Tlim of the engine torque. The target engine torque Tel limited to a value equal to or larger than the lower limit Tlim is sent to a target fuel amount calculating section 507 to calculate a target fuel amount Ft for outputting the target engine torque Tel. In the target fuel amount calculating section 507, a three-dimensional map shown in FIG. 20 is referred to based on the engine speed Ne and the target engine torque Tel to obtain a target fuel amount Ft. That is, the amount Ft is calculated by:

$$Ft = f[Ne, Tel]$$

where Ft is the fuel amount per engine revolution cycle, and f[Ne,Tel] is the three-dimensional map having the engine speed Ne and the target torque Tel as parameters.

Note that Ft may be calculated by multiplying a coefficient Ka corresponding to the engine speed Ne and the target torque Tel, as shown in FIG. 21. That is, $$Ft = Ka(Ne) \cdot Tel$$

Furthermore, Ka(Ne) may be given as a constant.

The target fuel amount calculating section 507 corrects the fuel amount Ft in accordance with an intake air temperature and a atmospheric pressure to convert it into a fuel amount Fv under the standard atmospheric condition. That is, $$Fv = Ft/\{Kt(AT) \cdot Kp(AT)\}$$

where Kt is the density correction coefficient which changes as a function of an intake air temperature (AT) as a parameter, as shown in FIG. 22, and Kp is the density correction coefficient which changes as a function of an atmospheric pressure (AT) as a parameter, as shown in FIG. 23.

The target fuel amount Fv calculated in this manner is corrected in accordance with an intake air temperature by a target fuel amount correction section 508, thus obtaining a target fuel amount F0. That is, $$F0 = Fv \cdot Ka'(AT)$$

where F0 is the corrected target fuel amount, Fv is the non-corrected target fuel amount, and Ka' is the correction coefficient according to the intake air temperature (AT).

The target fuel amount Fv is corrected according to the intake air temperature for the following reason. As described above, the fuel amount Ft is set by the fuel controller 155 in accordance with an intake air amount to the engine. An air intake efficiency to the engine changes in accordance with the intake air temperature. When the intake air temperature AT is lower than a combustion chamber wall temperature CT of the engine 16, intake air is expanded when it is taken into a combustion chamber of the engine, and as a result, the intake efficiency is decreased. On the other hand, when the intake air temperature AT is higher than the combustion chamber wall temperature CT, intake air is contracted, and as a result, the intake efficiency is increased. For this reason, when the intake air temperature AT is low, the target fuel amount Fv is multiplied with the correction coefficient Ka' in consideration of expansion of intake air in the combustion chamber to set a relatively large value so as to compensate for a decrease in control precision due to a decrease in intake efficiency. When the intake air temperature AT is high, the target fuel amount Fv is multiplied with the correction coefficient Ka' to set a relatively small value so as to prevent a decrease in control precision due to an increase in intake efficiency. More specifically, as shown in FIG. 24, when the intake air temperature AT is higher than a reference intake air temperature AT0, the correction coefficient Ka' is decreased in accordance with the intake air temperature AT. When the intake air temperature AT is lower than the reference intake air temperature AT0, the correction coefficient Ka' is increased in accordance with the intake air temperature AT, thus obtaining the proper target fuel amount.

The target fuel amount F0 output from the target fuel amount correction section 508 is supplied to an equivalent target throttle opening calculating section 509, and a map shown in FIG. 25 is referred to, thus obtaining an equivalent target throttle opening $\theta b$ corresponding responding to the engine speed Ne and the target fuel amount F0. When one throttle value is arranged, the equivalent target throttle opening $\theta b$ is a throttle valve opening for attaining the target fuel amount F0. Furthermore, when the bypass path 52b for bypassing the sub throttle valve THs is arranged, an opening corresponding to an air amount passing through the bypass path 52b is subtracted from the equivalent target throttle opening $\theta b$. More specifically, a subtractor 510 subtracts an opening $\Delta\theta 1$ corresponding to the air amount passing through the bypass path from the equivalent target throttle opening $\theta b$.

The difference ($\theta b - \Delta\theta 1$) is supplied to a target throttle opening calculating section 512 to calculate a target throttle opening $\theta 2$ of the sub throttle valve THs when the throttle opening of the main throttle valve THm is $\theta 1$.

Figure 30:
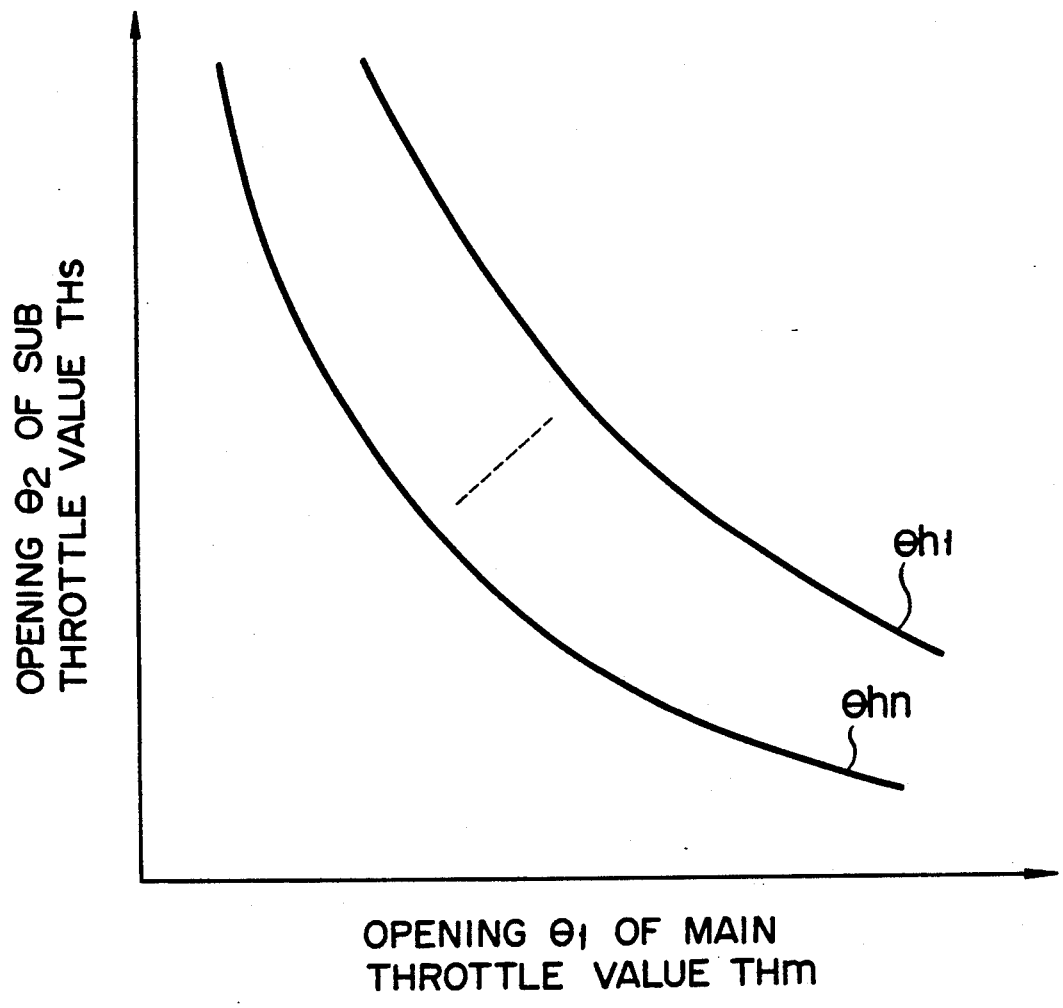
FIG. 30 is a graph showing an equivalent throttle opening curve.

The target throttle opening calculating section 512 stores a plurality of equivalent throttle opening curves $\theta h1$ to $\theta hn$, as shown in FIG. 30. The main throttle valve THm and the sub throttle valve THs are assumed as one equivalent throttle valve, and the relationship between the opening $\theta 1$ of the main throttle valve THm and the opening $\theta 2$ of the sub throttle valve TH is experimentally obtained for every equivalent throttle opening, thereby determining the equivalent throttle opening curves $\theta h1$ to $\theta hn$. Therefore, when the equivalent throttle opening and the opening $\theta 1$ of the main throttle valve THm are determined, the opening $\theta 2$ of the sub throttle valve THs can be uniquely determined.

The corrected target fuel amount F0 output from the target fuel amount correction section 508 is supplied to a subtractor 513 to calculate a difference $\Delta F$ from the present fuel amount F calculated by the fuel controller 155 every predetermined sampling time on the basis of the intake air amount of the engine detected by the air flow sensor 154. The difference $\Delta F$ is supplied to a PID controller 514 and is subjected to PID control to calculate an opening correction value $\Delta\theta 2$ corresponding to $\Delta F$. The opening correction value $\Delta\theta 2$ is added to the target throttle opening $\theta 2$ by an adder 515 to calculate a feedback-corrected target opening $\theta f$. That is, $$\theta f = \theta 2 + \Delta\theta 2$$

The opening correction value $\Delta\theta 2$ is obtained by adding an opening correction value $\Delta\theta p$ by proportional control, an opening correction value $\Delta\theta i$ by integral control, and an opening correction value $\Delta\theta d$ by differential control. That is, $\Delta\theta 2$ is given by:

$$\Delta\theta 2 = \Delta\theta p + \Delta\theta i + \Delta\theta d$$

where $$\Delta\theta p = Kp(Ne) \cdot Kth(Ne) \cdot \Delta F$$

$$\Delta\theta i = Ki(Ne) \cdot Kth(Ne) \cdot \Sigma(\Delta F)$$

$$\Delta\theta d = Kd(Ne) \cdot Kth(Ne) \cdot \{\Delta F - \Delta Fold\}$$

are calculated by the PID controller 514. Kp, Ki, and Kd are proportional, integral, and differential gains as a function of the engine speed Ne as a parameter, and FIGS. 26 to 28 show their characteristics. Kth is a $\Delta F \rightarrow \Delta\theta$ converting gain (FIG. 29) as a function of the engine speed Ne as a parameter, $\Delta F$ is a deviation between the target fuel amount F0 and the fuel amount F calculated by the fuel controller 155, and $\Delta Fold$ is $\Delta F$ at the immediately preceding sampling timing.

The target opening $\theta f$ obtained in this manner is supplied to the motor drive circuit 52 as a sub throttle valve opening signal $\theta s$, thereby controlling the opening of the sub throttle valve THs.

The wheel velocities VRR and VRL of the driven wheels are supplied to a centripetal acceleration calculating section 53 to calculate a centripetal acceleration GY' for judging a degree of turning. The centripetal acceleration GY' is supplied to a centripetal acceleration correction section 54 and is corrected in accordance with the vehicle velocity. That is, $$GY = Kv \cdot GY'$$

As shown in FIGS. 7 to 12, the coefficient Kv changes according to the vehicle velocity, thus correcting the centripetal acceleration GY.

The higher driven wheel velocity output from the SH 37 is subtracted from the wheel velocity VFR of the driving wheel by a subtractor 55. The higher driven wheel velocity output from the SH 37 is subtracted from the wheel velocity VFL of the driving wheel by a subtractor 56.

The output from the subtractor 55 is multiplied with KB (0<KB<1) by a multiplier 57, and the output from the subtractor 56 is multiplied with (1−KB) by a multiplier 58. Thereafter, the products from these multipliers are added to each other by an adder 59, thus obtaining a slip value DVFR of the right driving wheel. At the same time, the output from the subtractor 56 is multiplied with KB by a multiplier 60, and the output from the subtractor 55 is multiplied with (1−KB) by a multiplier 61. Thereafter, the products from these multipliers are added to each other by an adder 62, thus obtaining a slip value DVFL of the left driving wheel. The variable KB changes according to an elapse time from the beginning of traction control, as shown in FIG. 13. At the beginning of the traction control, the variable KB is set to be "0.5", and approaches "0.8" as the traction control progresses. For example, when KB is set to be "0.8", if only one driving wheel slips, it is recognized that the other driving wheel slips by 20%, brake control is also performed on the other wheel. If brakes of the left and right driving wheels are independently controlled, when one driving wheel is braked and its rotation speed is decreased, the other driving wheel slips due to the operation of a differential gear and is braked in turn. This operation is undesirably repeated. When slips of the driving wheels are decreased by the brakes, "KB=0.5" is set at the beginning of braking to simultaneously brake both the wheels, thereby eliminating an uncomfortable shock at a steering wheel at the beginning of braking on, e.g., a split road. The slip value DVFR of the right driving wheel is differentiated by a differential section 63 to calculate its changing value as a function of time, i.e., a slip acceleration GFR. The slip value DVFL of the left driving wheel is differentiated by a differential section 64 to calculate its changing value as a function of time, i.e., a slip acceleration GFL. The slip acceleration GFR is supplied to a braking hydraulic pressure variation ($\Delta$P) calculating section 65, and a GFR(GFL)-$\Delta$P conversion map shown in FIG. 14 is referred to, thereby calculating a variation $\Delta$P of a braking hydraulic pressure for suppressing the slip acceleration GFR. The variation $\Delta$P of the braking hydraulic pressure is supplied to a $\Delta$P-T converting section 67 through a switch S2 which is ON/OFF-controlled by the start/finish judging section 50, thereby calculating an open time T of the inlet valve 17$i$ and the outlet valve 17$o$ shown in FIG. 1A. When the variation $\Delta$P is positive, the open time of the inlet valve 17$i$ is calculated; when the variation $\Delta$P is negative, the open time of the outlet valve 17$o$ is calculated. Similarly, the slip acceleration GFL is supplied to a braking hydraulic pressure variation ($\Delta$P) calculating section 66, and the GFR(GFL)-$\Delta$P conversion map shown in FIG. 14 is referred to, thereby calculating a variation $\Delta$P of a braking hydraulic pressure for suppressing the slip acceleration GFL. The variation $\Delta$P of the braking hydraulic pressure is supplied to a $\Delta$P-T converting section 68 through a switch S3 which is ON/OFF-controlled by the start/finish judging section 50, thereby calculating an open time T of the inlet valve 18$i$ and the outlet valve 18$o$ shown in FIG. 1A. When the variation $\Delta$P is positive, the open time of the inlet valve 18$i$ is calculated; when the variation $\Delta$P is negative, the open time of the outlet valve 18$o$ is calculated. Note that the switches S1 to S3 are turned on/off in cooperation with each other.

In FIG. 14, when braking is performed during turning, the variation $\Delta$P changes as indicated by a broken line a to strengthen braking of the inner driving wheel during turning.

The operation of the first embodiment of the present invention with the above arrangement will be described below. In FIGS. 1A to 2B, the wheel velocities of the driven wheels (rear wheels) output from the wheel velocity sensors 13 and 14 are input to the SL 36, the SH 37, and the centripetal acceleration calculating section 53. The SL 36 selects a lower wheel velocity of the right and left driven wheels, and the SH 37 selects a higher wheel velocity of the right and left driven wheels. During normal straight travel, when the wheel velocities of the right and left driven wheels are equal to each other, the SL 36 and the SH 37 output the same wheel velocity. The centripetal acceleration calculating section 53 receives the wheel velocities of the right and left driven wheels, and calculates a degree of turning when the vehicle makes a turn on the basis of those wheel velocities of the right and left driven wheels, i.e., a degree of abrupt turning.

How to calculate the centripetal acceleration in the centripetal acceleration calculating section 53 will be described below. In a front-drive vehicle, since the rear wheels are driven wheels, a vehicle velocity at that position can be detected by the wheel velocity sensors regardless of a slip caused by the driving force. Therefore, an Ackerman geometry can be utilized. More specifically, during steady turning, the centripetal acceleration GY' is given by:

$$GY' = V^2/r \quad (4)$$

(V=vehicle velocity, r=radius of turning)

Figure 19:
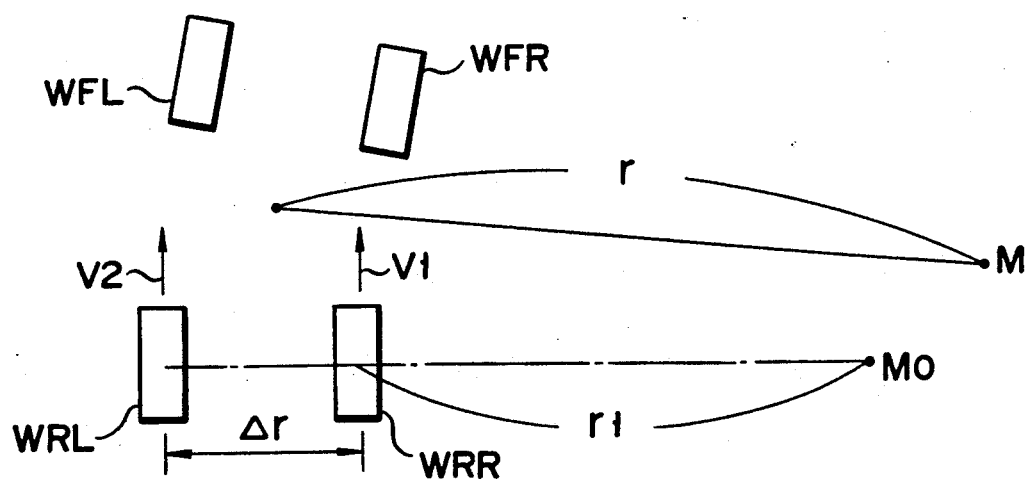
FIG. 19 is a view showing a vehicle turning state.

For example, as shown in FIG. 19, when the vehicle makes a right turn, if the center of turning is represented by M0, a distance from the center M0 of turning to an inner wheel side (WRR) is represented by r1, a tread is represented by $\Delta$r, a wheel velocity of the inner wheel side (WRR) is represented by v1, and a wheel velocity of an outer wheel side (WRL) is represented by v2, the following equation is established:

$$v2/v1 = (\Delta r + r1)/r1 \quad (5)$$

When equation (5) is modified, $$1/r1 = (v2-v1)/\Delta r \cdot v1 \quad (6)$$

The centripetal acceleration GY' with reference to the inner wheel side is given by:

$$\begin{aligned} GY' &= v1^2/r1 \\ &= v1^2 \cdot (v2 - v1)/\Delta r \cdot v1 \\ &= v1 \cdot (v2 - v1)/\Delta r \end{aligned} \quad (7)$$

More specifically, the centripetal acceleration GY' is calculated by equation (7). During turning, since the wheel velocity v1 of the inner wheel side is smaller than the wheel velocity v2 of the outer wheel side and the centripetal acceleration GY' is calculated using the wheel velocity v1 of the inner wheel side, the centripetal acceleration GY' is calculated to be smaller than actual one. Therefore, the coefficient KG of the weighting section 33 is estimated to be smaller since the centripetal acceleration GY' is estimated to be smaller. Therefore, since the driving wheel velocity VF is estimated to be smaller, the slip value DV' (=VF−V$\phi$) is also estimated to be smaller. Thus, since the target torque T$\phi$ is estimated to be larger, the target engine torque is estimated to be larger, so that a sufficient driving force can be given even during turning.

As shown in FIG. 19, although the distance from the inner wheel side to the center M0 of turning is r1 at an extremely low speed, the center of turning is shifted to M in a vehicle which tends to understeer as a speed is increased, and the distance becomes r (r<r1). In this manner, when the speed is increased, since the radius of turning is calculated as r1, the centripetal acceleration GY' is calculated based on equation (7) to be larger than the actual one. For this reason, the centripetal acceleration GY' calculated by the centripetal acceleration calculating section 53 is sent to the centripetal acceleration correction section 54, and is multiplied with the coefficient Kv shown in FIG. 7 to decrease the centripetal acceleration GY at a high speed. The variable Kv is set to be decreased in accordance with the vehicle velocity, but may be set, as shown in FIG. 8 or 9. In this manner, the corrected centripetal acceleration GY is output from the centripetal acceleration correction section 54.

Figure 10:
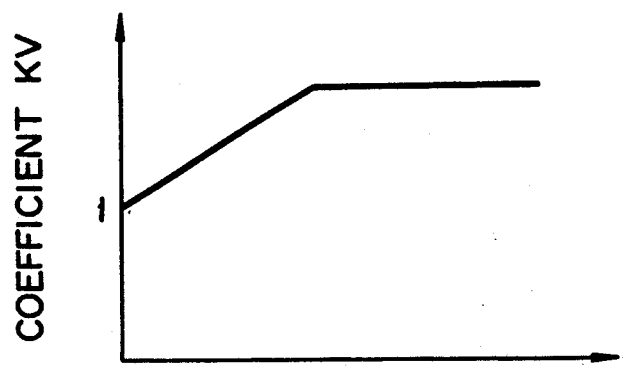
Figure 11:
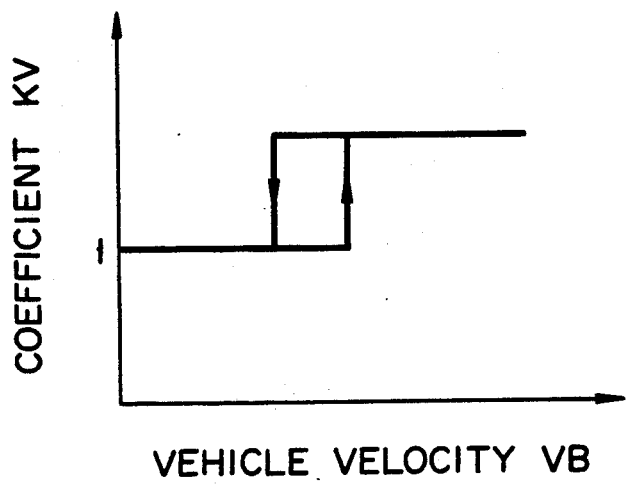
Figure 12:
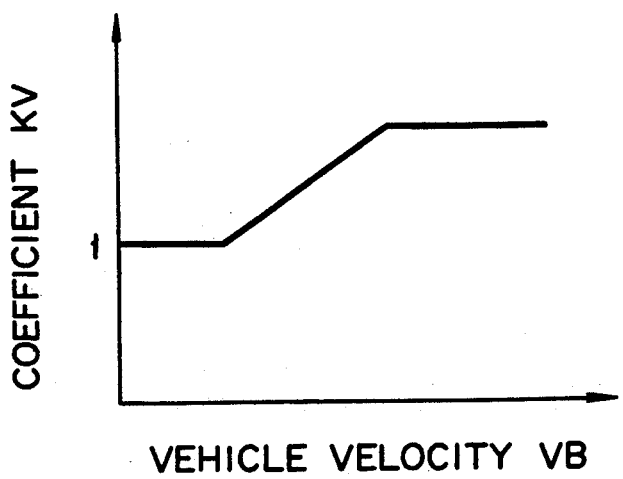

On the other hand, in a vehicle which tends to oversteer as a speed is increased (r<r1), correction quite opposite to the vehicle which tends to understeer is performed by the centripetal acceleration correction section 54. More specifically, one of variables Kv shown in FIGS. 10 to 12 is used, and the centripetal acceleration GY' calculated by the centripetal acceleration calculating section 53 is corrected to be increased as the vehicle velocity is increased.

The lower wheel velocity selected by the SL 36 is multiplied with the variable Kr by the weighting section 38, as shown in FIG. 4, and the higher wheel velocity selected by the SH 37 is multiplied with the variable (1−Kr) by the weighting section 39. The variable Kr is set to be $\int 1$" when the centripetal acceleration GY exceeds, e.g., 0.9 g during turning, and is set to be "0" when the centripetal acceleration is decreased to be smaller than 0.4 g.

Therefore, for turning during which the centripetal acceleration GY exceeds 0.9 g, the lower wheel velocity, i.e., inner wheel velocity upon turning is selected from the driven wheel velocities output from the SL 36. The wheel velocities output from the weighting sections 38 and 39 are added to each other by the adder 40 to obtain the driven wheel velocity VR. The driven wheel velocity VR is multiplied with $(1+\alpha)$ by the multiplier 40', thereby calculating the target driving wheel velocity V$\phi$.

Figure 18:
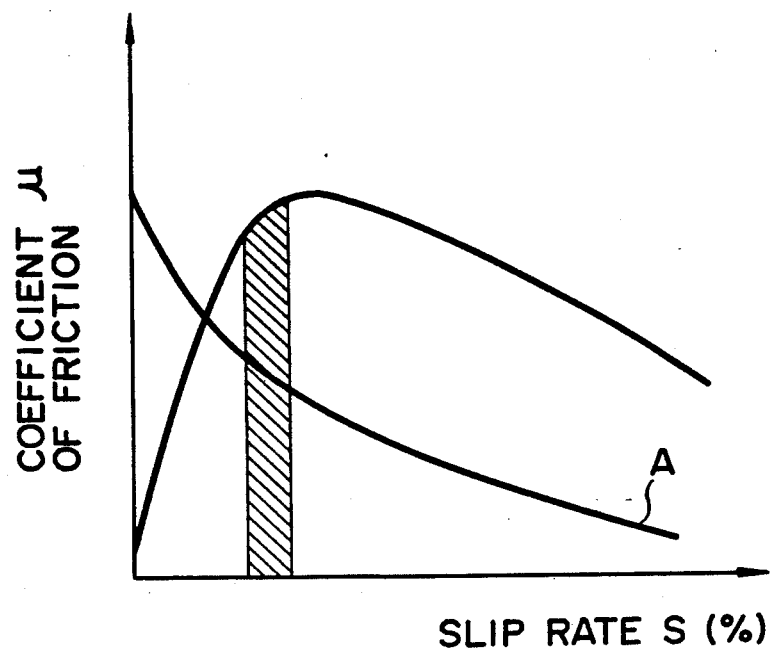

After the higher wheel velocity of the driving wheel velocities is selected by the SH 31, the selected velocity is multiplied with the variable KG by the weighting section 33, as shown in FIG. 3. An average wheel velocity (VFR+VFL)/2 of the driving wheels calculated by the averaging section 32 is multiplied with (1−KG) by the weighting section 34. The outputs from the weighting sections 33 and 34 are added to each other by the adder 35 to obtain the driving wheel velocity VF. Therefore, when the centripetal acceleration GY exceeds 0.1 g, since KG=1, the higher driving wheel velocity of the two driving wheel velocities which is output from the SH 31 is output. More specifically, when the degree of turning of the vehicle is increased and the centripetal acceleration GY exceeds 0.9, since "KG=Kr =1", the outer wheel side wheel velocity as a higher wheel velocity is selected as the driving wheel velocity VF for the driving wheel side, and the inner wheel side wheel velocity as a lower wheel velocity is selected as the driven wheel velocity VR for the driven wheel side. For this reason, the slip value DVi' (=VF−V$\phi$) calculated by the subtractor 41 is estimated to be larger than that in a straight travel state. Therefore, since the target torque T$\phi$ is estimated to be smaller than that in the straight travel state the engine output is decreased to be smaller than that in the straight travel state to decrease the slip rate S, thereby increasing a lateral force A, as shown in FIG. 18. As a result, a gripping force of the wheels during turning can be increased, thus assuring safe turning.

The slip correction value Vg shown in FIG. 5 is added to the slip value DVi' by the slip value correction section 43 only during turning, i.e., only when the centripetal acceleration GY is generated, and the slip value Vd shown in FIG. 6 is added to the sum by the slip value correction section 44. For example, when a vehicle is assumed to make a turn at a right-angle corner, the centripetal acceleration GY and its changing rate $\Delta$GY as a function of time become positive values in the first half of the turn. However, the changing rate $\Delta$GY as a function of time of the centripetal acceleration GY becomes a negative value in the second half of turn. Therefore, in the first half of the turn, the sip correction value Vg (>0) shown in FIG. 5 and the slip correction value Vd (>0) shown in FIG. 6 are added to the slip value DVi' by the adder 452 to yield the slip value DVi. In the second half of the turn, the slip correction value Vg (>0) and the slip correction value Vd (<0) are added to the slip value DVi' to obtain the slip value DVi. Therefore, when the slip value DVi in the second half of the turn is estimated to be smaller than that in the first half of the turn, the engine output is decreased to increase the lateral force in the first half of the turn, and the engine output is recovered to be larger than that in the first half to improve acceleration characteristics of the vehicle in the second half of the turn.

In this manner, the corrected slip value DVi is set to the TSn calculating section 45 at a 15-ms sampling time T. The slip values DVi are integrated while being multiplied with the coefficient KI by the TSn calculating section 45, thereby obtaining the correction torque TSn given by:

$$TSn = GKi \cdot \Sigma KI \cdot DVi$$

(where KI is the coefficient which changes according to the slip value DVi). That is, the correction torque obtained by integrating the slip values DVi, i.e., the integral correction torque TSn is calculated.

The slip value DVi is sent to the TPn calculating section 46 every sampling time T, thereby calculating the correction torque TPn given by:

$$TPn = GKp \cdot DVi \cdot Kp$$

(where Kp is the coefficient). That is, the correction torque proportional to the slip value DVi, i.e., the proportional correction torque TPn is calculated.

The values of the coefficients GKi and GKp used in calculations of the coefficient multipliers 45b and 46b are switched to values according to the transmitted transmission range after the elapse of a predetermined period of time from the beginning of transmission in a shift-up operation for the following reason. It takes much time from the beginning of transmission until the transmission range is actually switched to complete the transmission operation. If the coefficients GKi and GKp corresponding to a transmitted higher-speed range are used from the beginning of transmission in the shift-up operation, the values of the correction torques TSn and TPn become values corresponding to the higher-speed range, i.e., become smaller than those before the beginning of transmission although the actual transmission operation is not yet completed. For this reason, the target torque T$\phi$ is undesirably increased, and a slip is induced, resulting in unstable control.

The driving wheel velocity VR output from the adder 40 is input to the reference torque calculating section 47 as the vehicle velocity VB. The vehicle acceleration calculating section 47a calculates the acceleration V̇B(GB) of the vehicle velocity. The acceleration GB of the vehicle velocity calculated by the vehicle acceleration calculating section 47a is filtered through one of the filters represented by equations (1) to (3) by the filter 47b, as has been described in the description of the arrangement, so that GBF is controlled to an optimal position in accordance with the state of the acceleration GB. The reference torque calculating section 47c calculates the reference torque TG (=GBF W·Re).

The integral correction torque TSn is subtracted from the reference torque TG by the subtractor 48, and the proportional correction torque TPn is subtracted from the difference by the subtractor 49. In this manner, the target torque $T\phi$ is calculated as:

$$T\phi = TG - TSn - TPn$$

The target torque $T\phi$, i.e., the axle torque $T\phi$ is input to the adder 501 through the switch S1, and is corrected on the basis of e.g., a cooling water temperature of the engine 16. The corrected axle torque $T\phi 1$ output from the adder 501 is converted to the target engine torque Te by the engine torque calculating section 503. The target engine torque Te is added to the correction value Tea of the target engine torque Te corresponding to atmospheric conditions or the like by the adder 504. The lower limit of the target engine torque Tel corrected in this manner is limited by the lower limit setting section 506 for setting the lower limit Tlim of the engine torque. The target engine torque Tel is supplied to the target fuel amount calculating section 507, thereby calculating the target fuel amount Ft for outputting the target engine torque Tel.

The fuel amount Ft is corrected in accordance with an intake air temperature and an atmospheric pressure by the target fuel amount calculating section 507 and is converted to the fuel amount Fv in a standard atmospheric state.

The target fuel amount Fv calculated in this manner is corrected in accordance with an intake air temperature by the target fuel amount correction section 508, thus obtaining the target fuel amount F0.

The target fuel amount F0 output from the target fuel amount correction section 508 is supplied to the equivalent target throttle opening calculating section 509, and the map shown in FIG. 25 is referred to, thereby obtaining the equivalent target throttle opening $\theta$b corresponding to the engine speed Ne and the target fuel amount F0. The subtractor 510 subtracts the opening $\Delta\theta 1$ corresponding to an air amount passing through the bypass path 52b from the equivalent target throttle opening $\theta$b.

The equivalent throttle opening ($\theta$b $-\Delta\theta 1$) is sent to the target throttle opening calculating section 512 to select an equivalent throttle opening curve corresponding to the equivalent throttle opening ($\theta$b $-\Delta\theta 1$) from FIG. 30. The Y-coordinate on the selected throttle opening curve when the throttle opening $\theta 1$ of the main throttle valve THm is the X-coordinate is calculated as the target throttle opening $\theta 2$ of the sub throttle valve THs.

The corrected target fuel amount F0 output from the target fuel amount correction section 508 is supplied to the subtractor 513, thus calculating the difference $\Delta F$ from the present fuel amount F calculated by the fuel controller 155 every predetermined sampling time on the basis of the intake air amount of the engine detected by the air flow sensor 154. The difference $\Delta F$ is sent to the PID controller 514, and PID control is performed on the basis of $\Delta F$ to calculate the opening correction value $\Delta\theta 2$ corresponding to $\Delta F$. The opening correction value is added to the target throttle opening $\theta 2$ by the adder 515, thereby calculating the feedback-corrected target opening $\theta f$.

The target opening $\Delta F$ obtained in this manner is supplied to the motor drive circuit 52 as the sub throttle valve opening signal $\theta$s to control the opening of the sub throttle valve THs. As a result, the engine output is controlled to coincide with the target engine torque Tel.

The higher driven wheel velocity output from the SH 37 is subtracted from the driving wheel velocity VFR by the subtractor 55. Furthermore, the higher driven wheel velocity output from the SH 37 is subtracted from the driving wheel velocity VFL by the subtractor 56. Therefore, the outputs from the subtractors 55 and 56 are estimated to be smaller than a value for controlling the engine torque, so that the number of times of use of brakes during turning is decreased, thereby eliminating a slip of the driving wheels due to decreasing the engine torque.

The output from the subtractor 55 is multiplied with KB (0<KB<1) by the multiplier 57. The output from the subtractor 56 is multiplied with (1−KB) by the multiplier 58. Thereafter, the outputs from the multipliers 57 and 58 are added to each other by the adder 59 to obtain the slip value DVFR for the right driving wheel. At the same time, the output from the subtractor 56 is multiplied with KB by the multiplier 60, and the output from the subtractor 55 is multiplied (1−KB) with the multiplier 61. Thereafter, the outputs from the multipliers 60 and 61 are added to each other by the adder 62, thus obtaining the slip value DVFL for the left driving wheel. The variable KB changes in accordance with an elapse time t from the beginning of traction control, as shown in FIG. 13. The variable KB is set to be "0.5" at the beginning of traction control, and is set to approach "0.8" along with the traction control. When a slip of the driving wheels is eliminated by the brakes, both the wheels are simultaneously braked at the beginning of braking, and an uncomfortable shock at a steering wheel at the beginning of braking on, e.g., a split road can be eliminated. An operation when brake control is continued and KB becomes "0.8" will be described below. In this case, when only one driving wheel slips, it is recognized that the other driving wheel also slips by 20% of one driving wheel, brake control is also performed on the other wheel. If brakes of the left and right driving wheels are independently controlled, when one driving wheel is braked and its rotation speed is decreased, the other driving wheel slips due to the operation of a differential gear and is braked in turn. This operation is undesirably repeated. The slip value DVFR for the right driving wheel is differentiated by the differential section 63, thus calculating its changing value as a function of time, i.e., the slip acceleration GFR. At the same time, the slip value DVFL for the left driving wheel is differentiated by the differential section 64, thus calculating its changing value as a function of time, i.e., the slip acceleration GFL. The slip acceleration GFR is sent to the $\Delta P$ calculating section 65, and the GFR (GFL)−$\Delta P$ conversion map shown in FIG. 14 is referred to, thus obtaining the variation ΔP of the braking hydraulic pressure for suppressing the slip acceleration GFR.

The variation ΔP is supplied to the ΔP-T converting section 67 for calculating the open time T of the inlet valve 17i and the outlet valve 17o when the switch S2 is closed, i.e., when the start/finish judging section 50 judges the control start condition is established. The valve open time T calculated by the ΔP-T converting section 67 is set as a brake operation time FR for the right driving wheel WFR. Similarly, the slip acceleration GFL is supplied to the ΔP calculating section 66, and the GFR (GFL)−ΔP conversion map shown in FIG. 14 is referred to, thus obtaining the variation ΔP of the braking hydraulic pressure for suppressing the slip acceleration GFL. The variation ΔP is supplied to the ΔP-T converting section 68 for calculating the open time T of the inlet valve 18i and the outlet valve 18o when the switch S3 is closed, i.e., when the start/finish judging section 50 judges the control start condition is established. The valve open time T calculated by the ΔP-T converting section 68 is set as a brake operation time FL for the left driving wheel WFL. Thus, further slips of the left and right driving wheels WFR and WFL can be suppressed.

In FIG. 14, when braking is performed during turning, the variation ΔP changes as indicated by a broken line a to strengthen braking of the inner driving wheel during turning. In this manner, although the inner wheel side tends to slip since the weight is shifted to the outer wheel side during turning, the inner wheel side can be prevented from slipping by setting the variation ΔP of the braking hydraulic pressure of the inner wheel side to be larger than that of the outer wheel side.

In the above embodiment, feedback control is performed by PID control based on ΔF to correct the target opening θ2. However, control may be made as follows. That is, the opening of the sub throttle valve THs detected by the sensor TPS2 may be increased by the correction value Δθ2 obtained by PID control based on ΔF.

In the first embodiment, the fuel amount Ft calculated by the fuel controller 155 is fed back to the subtractor 153. However, the actual drive time of the fuel injection valve 156 may be detected and may be converted to a fuel amount to be fed back to the subtractor 153.

According to the first embodiment, since a target throttle opening is calculated after a target engine output is converted to a target fuel amount, even if an atmospheric pressure or an air density changes, a proper target throttle opening can be obtained by correcting the target fuel amount in accordance with the atmospheric pressure or the air density. The engine output varies in accordance with the throttle opening. This is because an intake air amount varies in accordance with the throttle opening and then the fuel amount is calculated on the basis of the intake air amount. The fuel amount influences directly the engine output. Since the amount of a fuel, which directly influences an engine output, is feedback-controlled to control the fuel amount to be equal to the target fuel amount, a vehicle engine output control method and apparatus which can improve engine output control precision can be provided.

Figure 31:
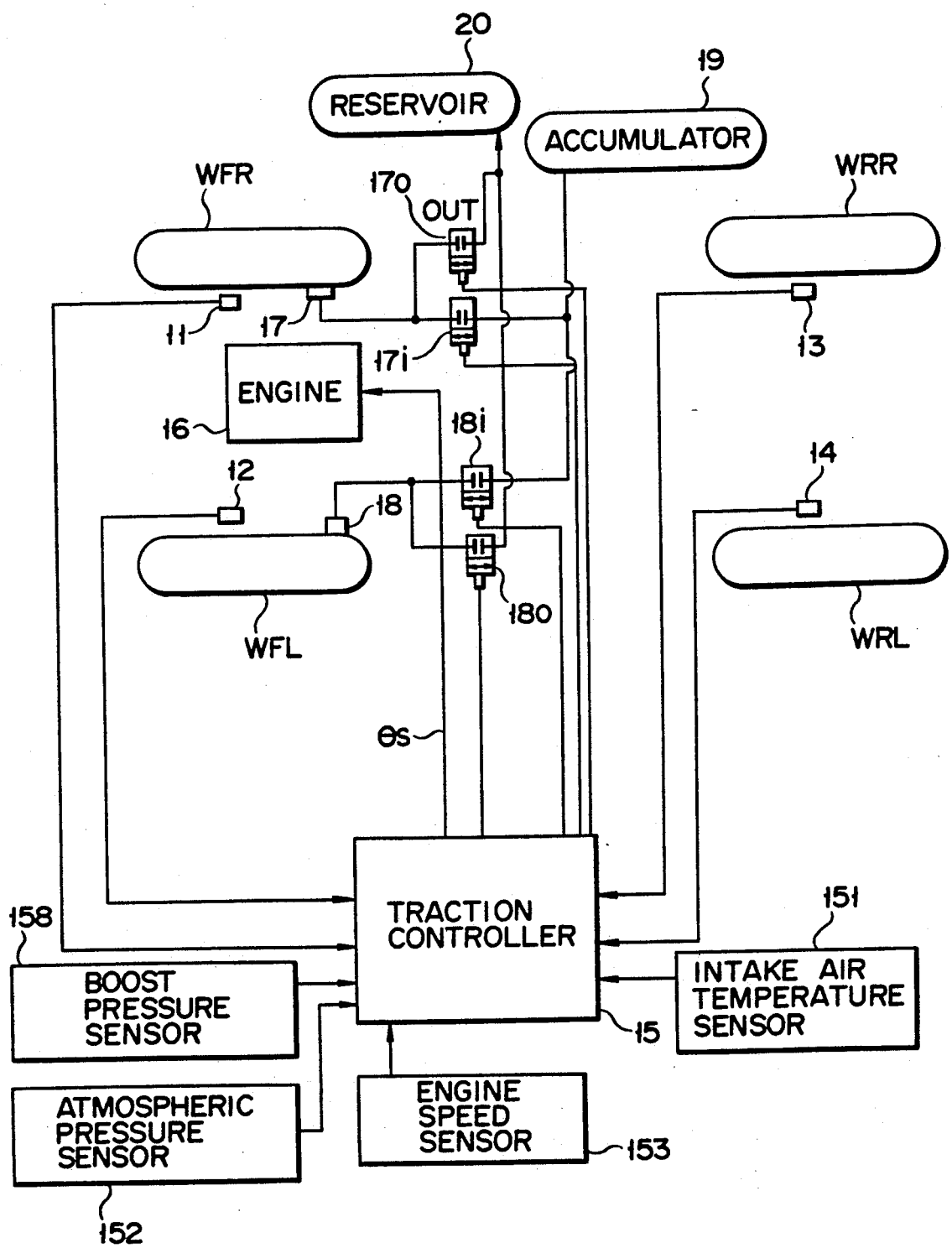
FIG. 31 is a block diagram showing the overall arrangement of an engine output control apparatus to which an engine output control method according to the second embodiment of the present invention is applied.
Figure 32:
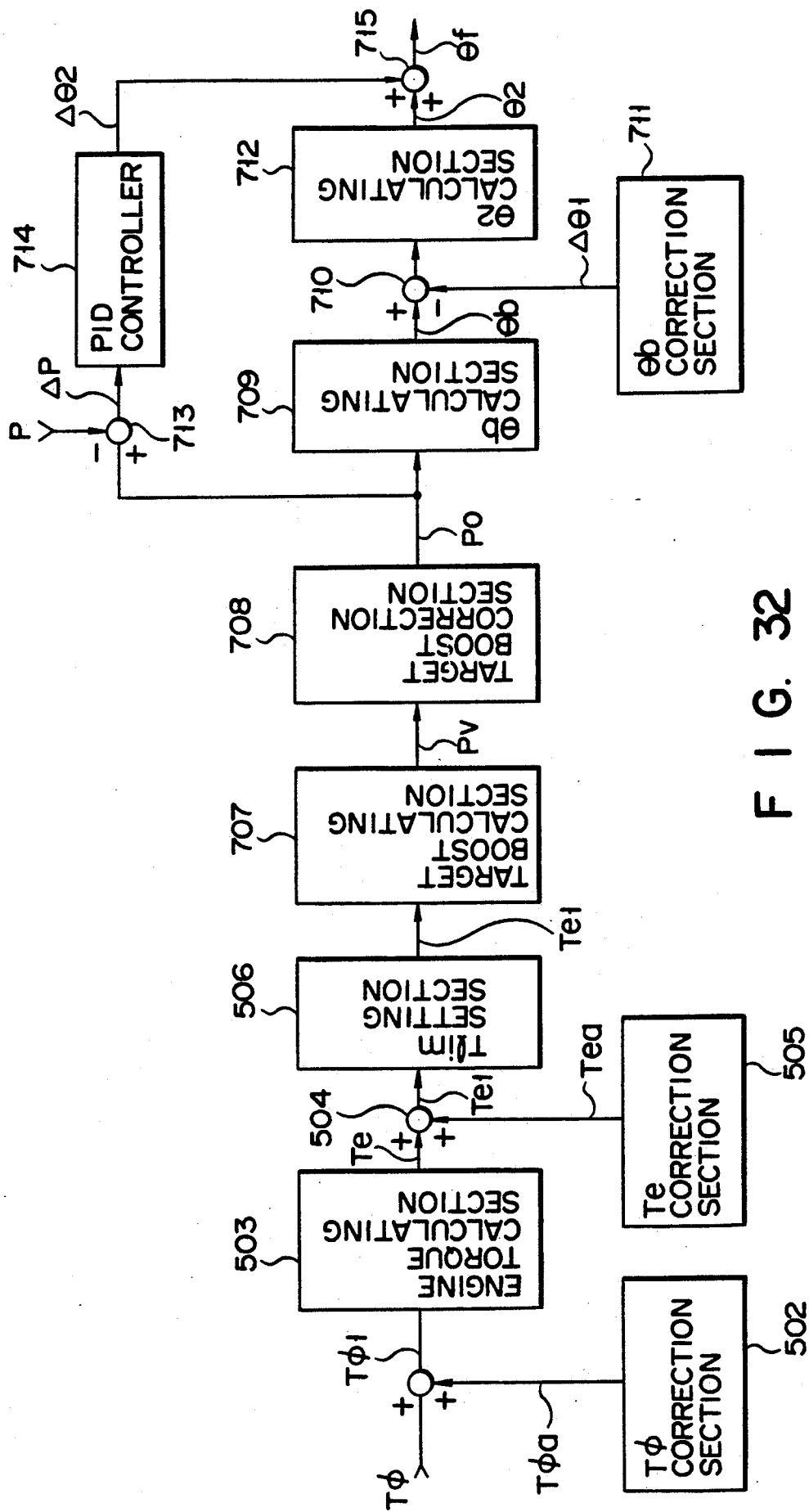
FIG. 32 is a block diagram showing main control functions of a traction controller shown in FIG. 31 in units of functional blocks.

A vehicle engine output control method and apparatus according to the second embodiment of the present invention will be described hereinafter. In the first embodiment, after the target engine torque Tel is calculated, the target fuel amount Ft necessary for generating the target engine torque Tel is calculated. In the second embodiment, however, after the target engine torque Tel is calculated, a target boost value Pt necessary for generating the target engine torque Tel is calculated. Therefore, the drawings referred in the first embodiment are commonly used in the second embodiment except that FIG. 31 is referred in place of FIG. 1A; FIG. 32 in place of FIG. 2B; FIG. 33 in place of FIG. 20; and FIG. 34 in place of FIG. 25.

The same reference numerals in FIG. 31 denote the same parts as in FIG. 1A, and a detailed description thereof will be omitted. In FIG. 31, reference numeral 158 denotes a boost pressure sensor for detecting a boost pressure P. The boost pressure P detected by the boost pressure sensor 158 is output to the traction controller 15.

The relationship between a target boost value and a target air amount will be described in detail below. When the boost pressure of an engine is determined, an intake air amount taken into the engine is calculated, and the target throttle opening θ2 of the sub throttle valve THs is calculated based on the intake air amount. In this manner, the reason why the target throttle opening θ2 can be obtained when the boost pressure is determined will be described below. When the openings of the main and sub throttle valves THm and THs are increased, the intake air amount to the engine is also increased. When the openings of the main and sub throttle valves THm and THs are increased, the boost pressure Pt is increased to approach an atmospheric pressure. Therefore, the boost pressure Pt and the intake air amount have a correlation. That is, if the boost pressure is determined, an intake air amount per engine revolution cycle can be calculated. If the intake air amount is detected, the target throttle opening θ2 of the sub throttle valve THs can be obtained in consideration of an air amount passing through the bypass path 52b an the opening of the main throttle valve THm. In the second embodiment, the boost pressure necessary for obtaining the target engine torque Tel is calculated, and the target throttle opening θ2 of the sub throttle valve THs is obtained while performing various corrections, thereby realizing precise engine output control.

The arrangement after a target boost calculating section 707 will be described below with reference to FIG. 32. The target engine torque Tel limited to a value equal to o larger than the lower limit Tlim is sent to the target boost calculating section 707 to calculate a target boost pressure Pt for outputting the target engine torque Tel. In the target boost calculating section 707, a three-dimensional map shown in FIG. 33 is referred to based on the engine speed Ne and the target engine torque Tel to obtain the target boost pressure Pt. That is, the pressure Pt is calculated by:

$$Pt = f[Ne, Tel]$$

where Pt is the boost pressure, and f[Ne,Tel] is the three-dimensional map having the engine speed Ne and the target torque Tel as parameters.

Note that Pt may be calculated by multiplying a coefficient Ka corresponding to the engine speed Ne and the target torque Tel, as shown in FIG. 21. That is, $$Pt = Ka(Ne) \cdot Tel$$

Furthermore, Ka(Ne) may be given as a constant.

The target boost calculating section 707 corrects the boost pressure Pt in accordance with an intake air temperature and an atmospheric pressure to convert it into a boost pressure Pv under a standard atmospheric condition. That is, $$Pv = Pt / \{Kt(AT) \cdot Kp(AT)\}$$

where Kt is the density correction coefficient which changes as a function of an intake air temperature (AT) as a parameter, as shown in FIG. 22, and Kp is the density correction coefficient which changes as a function of an atmospheric pressure (AT) as a parameter, as shown in FIG. 23.

The target boost pressure Pv calculated in this manner is corrected in accordance with an intake air temperature by a target boost correction section 708, thus obtaining a target boost pressure P0. That is, $$P0 = Pv \cdot Ka'(AT)$$

where P0 is the corrected boost pressure, Pv is the noncorrected boost pressure, and Ka' is the correction coefficient according to the intake air temperature (AT) (FIG. 24).

The target boost pressure Pv is corrected according to the intake air temperature for the following reason. An intake air amount to the engine changes in accordance with the target boost pressure Pv. An air intake efficiency to the engine changes in accordance with the intake air temperature. When the intake air temperature AT is lower than a combustion chamber wall temperature CT of the engine 16, intake air is expanded when it is taken into a combustion chamber of the engine, and as a result, the intake efficiency is decreased. On the other hand, when the intake air temperature AT is higher than the combustion chamber wall temperature CT, intake air is contracted, and as a result, the intake efficiency is increased. For this reason, when the intake air temperature AT is low, the target boost pressure Pv is multiplied with the correction coefficient Ka' in consideration of expansion of intake air in the combustion chamber to set a relatively large value so as to compensate for a decrease in control precision due to a decrease in intake efficiency. When the intake air temperature AT is high, the target boost pressure Pv is multiplied with the correction coefficient Ka' to set a relatively small value so as to prevent a decrease in control precision due to an increase in intake efficiency. More specifically, as shown in FIG. 24, when the intake air temperature AT is higher than reference intake air temperature AT0, the correction coefficient Ka' is decreased in accordance with the intake air temperature AT. When the intake air temperature AT is lower than the reference intake air temperature AT0, the correction coefficient Ka' is increased in accordance with the intake air temperature AT, thus obtaining the proper target boost pressure.

The target boost pressure P0 output from the target boost correction section 708 is supplied to an equivalent target throttle opening calculating section 709, and a map shown in FIG. 34 is referred to, thus obtaining an equivalent target throttle opening $\theta b$ corresponding to the engine speed Ne and the target boost pressure P0. When one throttle value is arranged, the equivalent target throttle opening $\theta b$ is a throttle valve opening for attaining the target boost pressure P0. Furthermore, when the bypass path 52b for bypassing the sub throttle valve THs is arranged, an opening corresponding to an air amount passing through the bypass path 52b is subtracted from the equivalent target throttle opening $\theta b$. More specifically, a subtractor 710 subtracts an opening $\Delta \theta 1$ corresponding to the air amount passing through the bypass path from the equivalent target throttle opening $\theta b$.

The difference ($\theta b - \Delta \theta 1$) is supplied to a target throttle opening calculating section 712 to calculate a target throttle opening $\theta 2$ of the sub throttle valve THs when the throttle opening of the main throttle valve THm is $\theta 1$.

The target throttle opening calculating section 712 stores a plurality of equivalent throttle opening curves $\theta h1$ to $\theta hn$ shown in FIG. 30 described in the first embodiment. The target throttle opening calculating section 712 obtains the target throttle opening $\theta 2$ of the sub throttle valve THs in the same manner as in the first embodiment.

The corrected target boost pressure P0 output from the target boost correction section 708 is supplied to a subtractor 713 to calculate a difference $\Delta P$ from the present boost pressure P detected by a boost pressure sensor 158 every predetermined sampling time. The difference $\Delta P$ is supplied to a PID controller 714 and is subjected to PID control to calculate an opening correction value $\Delta \theta 2$ corresponding to $\Delta P$. The opening correction value $\Delta \theta$ is added to the target throttle opening $\theta 2$ by an adder 715 to calculate a feedback-corrected target opening $\theta f$. That is, $$\theta f = \theta 2 + \Delta \theta 2$$

The opening correction value $\Delta \theta 2$ is obtained by adding an opening correction value $\Delta \theta p$ by proportional control, an opening correction value $\Delta \theta i$ by integral control, and an opening correction value $\Delta \theta d$ by differential control. That is, $\Delta \theta 2$ is given by:

$$\Delta \theta 2 = \Delta \theta p + \Delta \theta i + \Delta \theta d$$

where $$\Delta \theta p = Kp(Ne) \cdot Kth(Ne) \cdot \Delta P$$

$$\Delta \theta i = Ki(Ne) \cdot Kth(Ne) \cdot \Sigma(\Delta P)$$

$$\Delta \theta d = Kd(Ne) \cdot Kth(Ne) \cdot \{\Delta P - \Delta Pold\}$$

are calculated by the PID controller 714. Kp, Ki, and Kd are proportional, integral, and differential gains as a function of the engine speed Ne as a parameter, and FIGS. 26 to 28 show their characteristics. Kth is a $\Delta P \rightarrow \Delta \theta$ converting gain (FIG. 29) as a function of the engine speed Ne as a parameter, $\Delta P$ is a deviation between the target boost pressure P0 and the boost pressure P detected by the boost pressure sensor 158, and $\Delta Pold$ is $\Delta P$ at the immediately preceding sampling timing.

The target opening $\theta f$ obtained in this manner is supplied to the motor drive circuit 52 as a sub throttle valve opening signal $\theta s$, thereby controlling the opening of the sub throttle valve THs. The operation of the second embodiment will be described below. The operation up to the lower limit setting section 506 is the same as that in the first embodiment, and a detailed description thereof will be omitted. Therefore, the operation after the target boost pressure calculating section 707 will be described below. The target engine torque Tel is supplied to the target boost calculating section 707, thereby calculating the target boost pressure Pt for outputting the target engine torque Tel.

The boost pressure Pt is corrected in accordance with an intaker air temperature and an atmospheric pressure by the target boost calculating section 707 and is converted to the boost pressure in a standard atmospheric state.

The target boost pressure Pv calculated in this manner is corrected in accordance with an intake air temperature by the target boost correction section 708, thus obtaining the target boost pressure P0.

The target boost pressure P0 output from the target boost correction section 708 is supplied to the equivalent target throttle opening calculating section 709, and the map shown in FIG. 34 is referred to, thereby obtaining the equivalent target throttle opening $\theta b$ corresponding to the engine speed Ne and the target boost pressure P0. The subtractor 710 subtracts the opening $\Delta\theta 1$ corresponding to an air amount passing through the bypass path 52b from the equivalent target throttle opening $\theta b$.

The equivalent throttle opening $(\theta b - \Delta\theta 1)$ is sent to the target throttle opening calculating section 712 to select an equivalent throttle opening curve corresponding to the equivalent throttle opening $(\theta b - \Delta\theta 1)$ from FIG. 30. The Y-coordinate on the selected throttle opening curve when the throttle opening $\theta 1$ of the main throttle valve THm is the X-coordinate is calculated as the target throttle opening $\theta 2$ of the sub throttle valve THs.

The corrected target boost pressure P0 output from the target boost correction section 708 is supplied to the subtractor 713, thus calculating the difference $\Delta P$ from the present boost pressure P detected by the boost pressure sensor 158 every predetermined sampling time. The difference $\Delta P$ is sent to the PID controller 714, and PID control is performed on the basis of $\Delta P$ to calculate the opening correction value $\Delta\theta 2$ corresponding to $\Delta P$. The opening correction value $\Delta\theta 2$ is added to the target throttle opening $\theta 2$ by the adder 715, thereby calculating the feedback-corrected target opening $\theta f$.

The target opening $\theta f$ obtained in this manner is supplied to the motor drive circuit 52 as the sub throttle valve opening signal $\theta s$ to control the opening of the sub throttle valve THs. As a result, the engine output is controlled to coincide with the target engine torque Tel.

In the above embodiment, feedback control is performed by PID control based on $\Delta P$ to correct the target opening $\theta 2$. However, control may be made as follows. That is, the opening of the sub throttle valve THs detected by the sensor TPS2 may be increased by the correction value $\Delta\theta 2$ obtained by PID control based on $\Delta P$.

According to the second embodiment as described above, since the target throttle opening is obtained after the target engine output is converted to the target boost pressure, a proper target throttle opening can be obtained by correcting the target boost pressure in accordance with an atmospheric pressure or an air density even if the atmospheric pressure or the air density is changed. An actual boost pressure which directly influences the engine output is feedback-controlled so that the boost pressure is controlled to coincide with the target boost pressure. Therefore, a vehicle engine output control method and apparatus which can improve engine output control precision can be provided.

Figure 36:
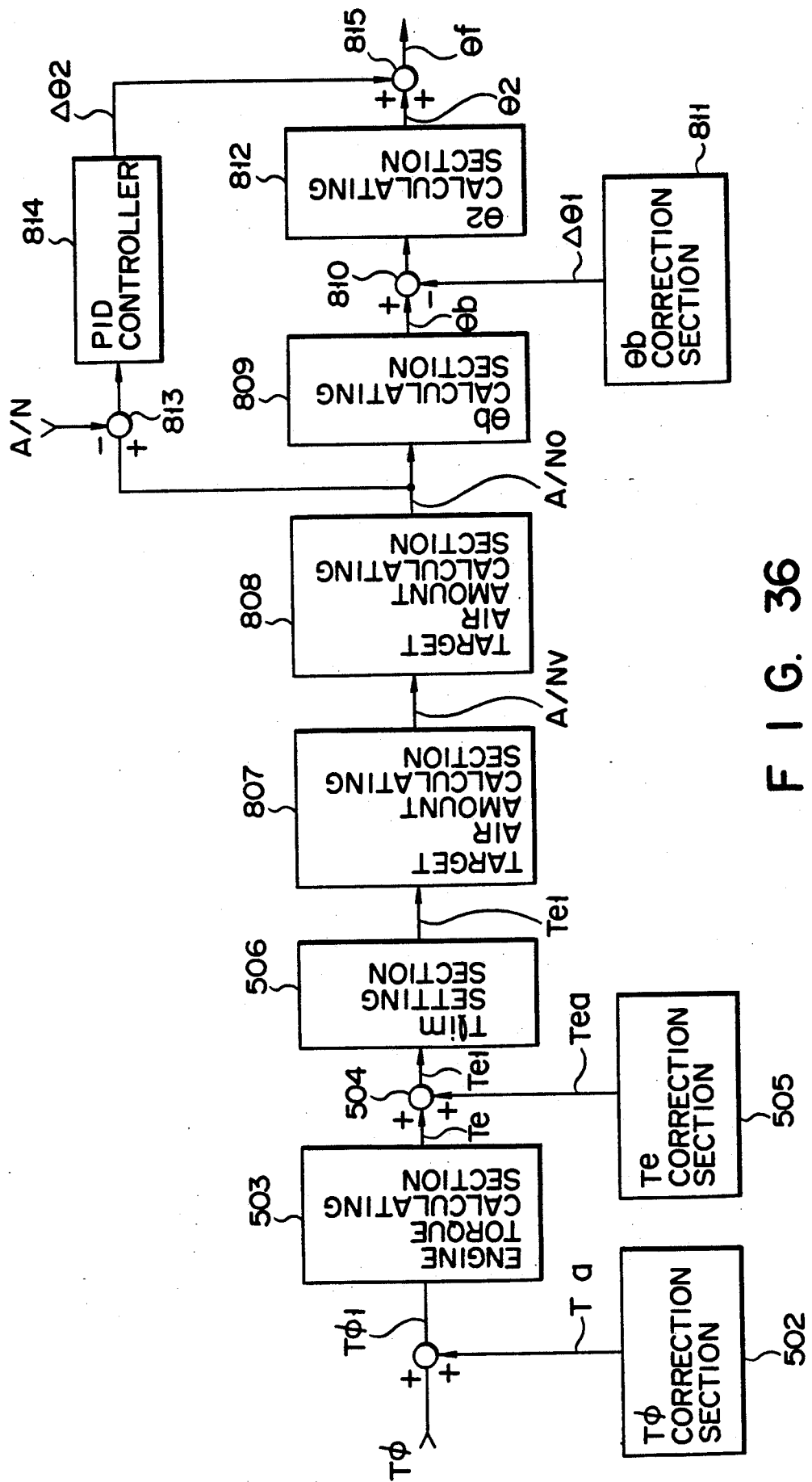
FIG. 36 is a block diagram showing main control functions of a traction controller shown in FIG. 35 in units of functional blocks.
Figures 37, 38:
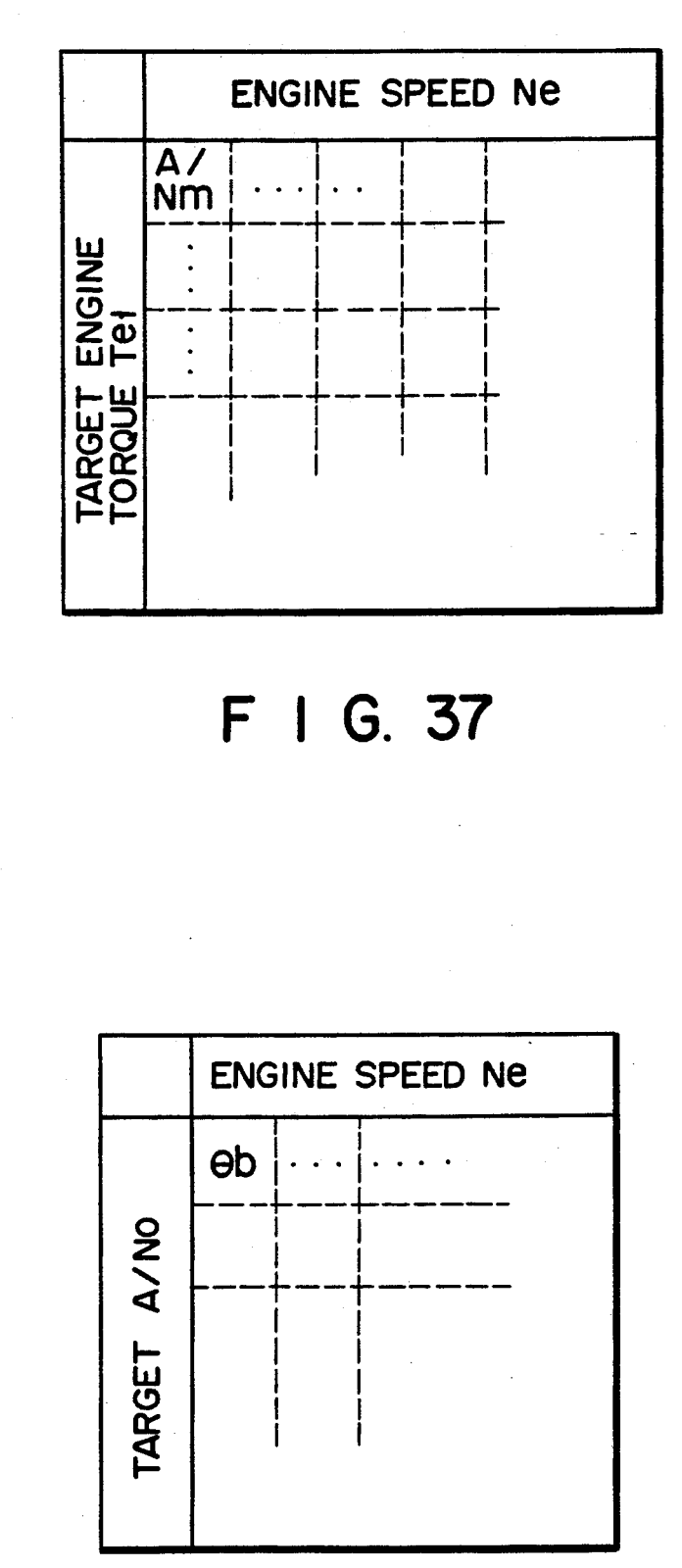

A vehicle engine output control method and apparatus according to the third embodiment of the present invention will be described hereinafter. In the first embodiment, after the target engine torque Tel is calculated, the target fuel amount Ft necessary for generating the target engine torque Tel is calculated. In the third embodiment, however, after the target engine torque Tel is calculated, a target air amount A/Nm per engine revolution cycle necessary for generating the target engine torque Tel is calculated. Therefore, the drawings referred in the first embodiment are commonly used in the third embodiment except that FIG. 35 is referred in place of FIG. 1A; FIG. 36 in place of FIG. 2B; FIG. 37 in place of FIG. 20; and FIG. 38 in place of FIG. 25.

The same reference numerals in FIG. 35 denote the same parts as in FIG. 1A, and a detailed description thereof will be omitted. In FIG. 35, an intake air amount A/N per engine revolution cycle detected by the air flow sensor 154 is input to the traction controller 15.

The arrangement after a target air amount calculating section 807 will be described below with reference to FIG. 36. The target engine torque Tel limited to a value equal to or larger than the lower limit Tlim is sent to the target air amount calculating section 807 to calculate a target air amount (mass) A/Nm for outputting the target engine torque Tel. The reason why the mass is calculated as the target air amount is that an intake air amount necessary for combusting a given amount of fuel is determined by its mass. An expression "target air amount (volume)" implying the volume of the target air amount is used in this specification for the following reason. That is, the throttle valve controls not the mass but the volume of the intake air amount.

In the target air amount calculating section 807, a three-dimensional map shown in FIG. 37 is referred to based on the engine speed Ne and the target engine torque Tel to obtain the target air amount (mass) A/Nm. That is, the air amount A/Nm is calculated by:

$$A/Nm = f[Ne, Tel]$$

where A/Nm is the intake air amount per engine revolution cycle, and f[Ne,Tel] is the three-dimensional map having the engine speed Ne and the target torque Tel as parameters.

Note that A/Nm may be calculated by multiplying a coefficient Ka corresponding to the engine speed Ne and the target torque Tel, as shown in FIG. 21. That is, $$A/Nm = Ka(Ne) \cdot Tel$$

Furthermore, Ka(Ne) may be given as a constant.

The target air amount calculating section 807 corrects the intake air amount (mass) A/Nm in accordance with an intake air temperature and an atmospheric pressure to convert it into an intake air amount (volume) A/Nv under a standard atmospheric condition. That is, $$A/Nv = A/Nm / \{Kt(AT) \cdot Kp(AT)\}$$

where A/Nv is the intake air amount (volume) per engine revolution cycle, Kt is the density correction coefficient which changes as a function of an intake air temperature (AT) as a parameter, as shown in FIG. 22, and Kp is the density correction coefficient which changes as a function of an atmospheric pressure (AT)

as a parameter, as shown in FIG. 23. The target intake air amount (volume) A/Nv calculated in this manner is corrected in accordance with an intake air temperature by a target air amount correction section 808, thus obtaining a target air amount A/NO. That is, $$A/NO = A/Nv \cdot Ka'(AT)$$

where A/NO is the corrected target air amount, A/Nv is the non-corrected target air amount, and Ka' is the correction coefficient according to the intake air temperature (AT) (FIG. 24).

The above correction is made for the following reason. An air intake efficiency to the engine changes in accordance with the intake air temperature. When the intake air temperature AT is lower than a combustion chamber wall temperature CT of the engine 16, intake air is expanded when it is taken into a combustion chamber of the engine, and as a result, the intake efficiency is decreased. On the other hand, when the intake air temperature AT is higher than the combustion chamber wall temperature CT, intake air is contracted, and as a result, the intake efficiency is increased. For this reason, when the intake air temperature AT is low, the target air amount (volume) is multiplied with the correction coefficient Ka' in consideration of expansion of intake air in the combustion chamber to set a relatively large value so as to compensate for a decrease in control precision due to a decrease in intake efficiency. When the intake air temperature AT is high, the target air amount (volume) is multiplied with the correction coefficient Ka' to set a relatively small value so as to prevent a decrease in control precision due to an increase in intake efficiency. More specifically, as shown in FIG. 24, when the intake air temperature AT is higher than a reference intake air temperature ATO, the correction coefficient Ka' is decreased in accordance with the intake air temperature AT. When the intake air temperature AT is lower than the reference intake air temperature ATO, the correction coefficient Ka' is increased in accordance with the intake air temperature AT.

The target air amount A/NO output from the target air amount correction section 808 is supplied to an equivalent target throttle opening calculating section 809, and a map shown in FIG. 38 is referred to, thus obtaining an equivalent target throttle opening $\theta b$ corresponding to the engine speed Ne and the target air amount A/NO. When one throttle value is arranged, the equivalent target throttle opening $\theta b$ is a throttle valve opening for attaining the target air amount A/NO. Furthermore, when the bypass path 52b for bypassing the sub throttle valve THs is arranged, an opening corresponding to an air amount passing through the bypass path 52b is subtracted from the equivalent target throttle opening $\theta b$. More specifically, a subtractor 810 subtracts an opening $\Delta\theta 1$ corresponding to the air amount passing through the bypass path from the equivalent target throttle opening $\theta b$.

The difference $(\theta b - \Delta\theta 1)$ is supplied to a target throttle opening calculating section 812 to calculate a target throttle opening $\theta 2$ of the sub throttle valve THs when the throttle opening of the main throttle valve THm is $\theta 1$.

The target throttle opening calculating section 812 stores a plurality of equivalent throttle opening curves $\theta h1$ to $\theta hn$ shown in FIG. 30 described in the first embodiment. The target throttle opening calculating section 812 obtains the target throttle opening $\theta 2$ of the sub throttle valve THs in the same manner as in the first embodiment.

The corrected target air amount A/NO output from the target air amount correction section 808 is supplied to a subtractor 813 to calculate a difference $\Delta A/N$ from the present air amount detected by the air flow sensor every predetermined sampling time. The difference $\Delta A/N$ is supplied to a PID controller 814 and is subjected to PID control to calculate an opening correction value $\Delta\theta 2$ corresponding to $\Delta A/N$. The opening correction value $\Delta\theta 2$ is added to the target throttle opening $\theta 2$ by an adder 815 to calculate a feedback-corrected target opening $\theta f$. That is, $$\theta f = \theta 2 + \Delta\theta 2$$

The opening correction value $\Delta\theta 2$ is obtained by adding an opening correction value $\Delta\theta p$ by proportional control, an opening correction value $\Delta\theta i$ by integral control, and an opening correction value $\Delta\theta d$ by differential control. That is, $\Delta\theta 2$ is given by:

$$\Delta\theta 2 = \Delta\theta p + \Delta\theta i + \Delta\theta d$$

where $$\Delta\theta p = Kp(Ne) \cdot Kth(Ne) \cdot \Delta A/N$$

$$\Delta\theta i = Ki(Ne) \cdot Kth(Ne) \cdot \Sigma(\Delta A/N)$$

$$\Delta\theta d = Kd(Ne) \cdot Kth(Ne) \cdot \{\Delta A/N - \Delta A/Nold\}$$

are calculated by the PID controller 814. Kp, Ki, and Kd are proportional, integral, and differential gains as a function of the engine speed Ne as a parameter, and FIGS. 26 to 28 show their characteristics. Kth is a $\Delta A/N \rightarrow \Delta\theta$ converting gain (FIG. 29) as a function of the engine speed Ne as a parameter, $\Delta A/N$ is the deviation between the target air amount A/NO and the measured A/N, and $\Delta A/Nold$ is $\Delta A/N$ at the immediately preceding sampling timing.

The target opening $\theta f$ obtained in this manner is supplied to the motor drive circuit 52 as a sub throttle valve opening signal $\theta s$, thereby controlling the opening of the sub throttle valve THs.

The operation of the third embodiment will be described below. The operation up to the lower limit setting section 506 is the same as that in the first embodiment, and a detailed description thereof will be omitted. Therefore, the operation after the target air amount calculating section 807 will be described below. The target engine torque Tel is supplied to the target air amount calculating section 807, thereby calculating the target air amount (mass) A/Nm for outputting the target get engine torque Tel.

The intake air amount (mass) A/Nm is corrected in accordance with an intake air temperature and an atmospheric pressure by the target air amount calculating section 807 and is converted to the intake air amount (volume) A/Nv in a standard atmospheric state.

The target intake air amount (volume) A/Nv calculated in this manner is corrected in accordance with an intake air temperature by the target air amount correction section 808, thus obtaining the target air amount A/NO.

The target air amount A/NO output from the target air amount correction section 808 is supplied to the equivalent target throttle opening calculating section 809, and the map shown in FIG. 38 is referred to, thereby obtaining the equivalent target throttle opening $\theta b$ corresponding to the engine speed Ne and the target air amount A/NO. The subtractor 810 subtracts the opening $\Delta\theta 1$ corresponding to an air amount passing through the bypass path 52b from the equivalent target throttle opening $\theta b$.

The equivalent throttle opening ($\theta b - \Delta\theta 1$) is sent to the target throttle opening calculating section 812 to select an equivalent throttle opening curve corresponding to the equivalent throttle opening ($\theta b - \Delta\theta 1$) from FIG. 30. The Y-coordinate on the selected throttle opening curve when the throttle opening $\theta 1$ of the main throttle valve THm is the X-coordinate is calculated as the target throttle opening $\theta 2$ of the sub throttle valve THs.

The corrected target air amount A/NO output from the target air amount correction section 808 is supplied to the subtractor 813, thus calculating the difference $\Delta A/N$ from the present air amount detected by the air flow sensor 154 every predetermined sampling time. The difference $\Delta A/N$ is sent to the PID controller 814, and PID control is performed on the basis of $\Delta A/N$ to calculate the opening correction value $\Delta\theta 2$ corresponding to $\Delta A/N$. The opening correction value $\Delta\theta 2$ is added to the target throttle opening $\theta 2$ by the adder 815, thereby calculating the feedback-corrected target opening $\theta f$.

The target opening $\theta f$ obtained in this manner is supplied to the motor drive circuit 52 as the sub throttle valve opening signal $\theta s$ to control the opening of the sub throttle valve THs. As a result, the engine output is controlled to coincide with the target engine torque Tel.

In the above embodiment, feedback control is performed by PID control based on $\Delta A/N$ to correct the target opening $\theta 2$. However, control may be made as follows. That is, the opening of the sub throttle valve THs detected by the sensor TPS2 may be increased by the correction value $\Delta\theta 2$ obtained by PID control based on $\Delta A/N$.

According to the third embodiment as described above, since the target throttle opening is obtained after the target engine output is converted to the target air amount, a proper target throttle opening can be obtained by correcting the target air amount in accordance with an atmospheric pressure or an air density even if the atmospheric pressure or the air density is changed. An actual intake air amount which directly influences the engine output is feedback-controlled so that the intake air amount is controlled to coincide with the target air amount. Therefore, a vehicle engine output control method and apparatus which can improve engine output control precision can be provided.

Note that in the first to third embodiments, the opening of the sub throttle valve is controlled in the engine in which two throttle valves, i.e., the main and sub throttle valves are disposed in the intake path to the engine, thereby controlling the engine output. However, the present invention is not limited to this. For example, the present invention may be applied to an engine which controls the engine output by one throttle valve. When the present invention is applied to such engine to control the engine output, the equivalent throttle opening ($\theta b - \Delta\theta 1$) output from the subtractor 510, 710, or 810 is set as the target throttle opening $\theta 2$ to control the opening of the throttle valve.

What is claimed is:

1. An engine output control method for a vehicle, comprising the steps of:
    setting a target output of an engine in accordance with an operation condition of a vehicle;
    converting the target output into a target fuel supply amount to said engine;
    converting the target fuel supply amount into a target opening of a throttle valve provided to an intake path of said engine;
    correcting the target opening in accordance with a deviation between an actual fuel supply amount to said engine and the target fuel supply amount; and
    open/close-controlling said throttle valve in accordance with the corrected target opening.

2. A method according to claim 1, wherein the operation condition of the vehicle includes a slip value of a driving wheel.

3. A method according to claim 1, wherein the step of converting the target output of said engine into the target fuel supply amount to said engine includes the step of correcting the target fuel supply amount in accordance with the operation condition of said engine.

4. A method according to claim 3, wherein the operation condition of the engine includes an intake air temperature taken into said engine.

5. A method according to claim 3, wherein the operation condition of the engine includes an atmospheric pressure.

6. An engine output control apparatus for a vehicle, comprising:
    operation condition detecting means for detecting an operation condition of the vehicle;
    target output setting means for setting a target output of an engine of the vehicle in accordance with the detection result of said operation condition detecting means;
    fuel supplying means for supplying fuel to said engine;
    target fuel supply amount setting means for setting a target fuel supply amount to said engine in accordance with the target output set by said target output setting means;
    a throttle valve arranged in an intake path of said engine;
    target opening setting means for setting a target opening of said throttle valve on the basis of the target fuel supply amount set by said target fuel supply amount setting means;
    fuel supply controlling means for controlling said fuel supplying means;
    fuel supply amount detecting mean for detecting an actual fuel supply amount to said engine;
    fuel supply amount deviation calculating means for calculating a deviation between the target fuel supply amount set by said target fuel supply amount setting means and the actual fuel supply amount detected by said fuel supply amount detecting means;
    opening correction value setting means for setting an opening correction value of the target opening set by said target opening setting means in accordance with the deviation calculated by said fuel supply amount deviation calculating means; and
    throttle valve controlling means for open/close-controlling said throttle valve in accordance with the target opening set by said target opening setting means and the opening correction value set by said opening correction value setting means.

7. An apparatus according to claim 6, wherein said operation condition detecting means detects a slip value of a drive wheel.

8. An apparatus according to claim 6, further comprising engine condition detecting means for detecting the operation condition of said engine, and said target fuel supply amount setting means corrects the target fuel supply amount in accordance with the operation condition of said engine detected by said engine condition detecting means.

9. An apparatus according to claim 8, wherein said engine condition detecting means comprises an intake air temperature sensor for detecting an intake air temperature taken into said engine.

10. An apparatus according to claim 8, wherein said engine condition detecting means comprises an atmospheric pressure sensor for detecting an atmospheric pressure.

11. An engine control method for a vehicle, comprising the steps of:
- setting a target output of an engine in accordance with an operation condition of a vehicle;
- converting the target output into a target boost pressure of said engine;
- converting the target boost pressure into a target opening of a throttle valve provided to an intake path of said engine;
- correcting the target opening in accordance with a deviation between an actual boost pressure of said engine and the target boost pressure; and
- open/close-controlling said throttle valve in accordance with the corrected target opening.

12. A method according to claim 11, wherein the operation condition of the vehicle includes a slip value of a drive wheel.

13. A method according to claim 11, wherein the step of converting the target output of said engine into the target boost pressure of said engine includes the step of correcting the target boost pressure in accordance with the operation condition of said engine.

14. A method according to claim 13, wherein the operation condition of the engine includes an intake air temperature taken into said engine.

15. A method according to claim 13, wherein the operation condition of the engine includes an atmospheric pressure.

16. An engine output control apparatus for a vehicle, comprising:
- operation condition detecting means for detecting an operation condition of the vehicle;
- target output setting means for setting a target output of an engine of the vehicle in accordance with the detection result of said operation condition detecting means;
- target boost pressure setting means for setting a target boost pressure of said engine in accordance with the target output set by said target output setting means;
- a throttle valve arranged in an intake path of said engine;
- target opening setting means for setting a target opening of said throttle valve on the basis of the target boost pressure set by said boost pressure setting means;
- boost pressure detecting means for detecting an actual boost pressure of said engine;
- boost pressure deviation calculating means for calculating a deviation between the target boost pressure set by said target boost pressure setting means and the actual boost pressure detected by said boost pressure detecting means;
- opening correction value setting means for setting an opening correction value of the target opening set by said target opening setting means in accordance with the deviation calculated by said boost pressure deviation calculating means; and
- throttle valve controlling means for open/close-controlling said throttle valve in accordance with the target opening set by said target opening setting means and the opening correction value set by said opening correction value setting means.

17. An apparatus according to claim 16, wherein said operation condition detecting means detects a slip value of a drive wheel.

18. An apparatus according to claim 16, further comprising engine condition detecting means for detecting the operation condition of said engine, and said target boost pressure setting means corrects the target boost pressure in accordance with the operation condition of said engine detected by said engine condition detecting means.

19. An apparatus according to claim 18, wherein said engine condition detecting means comprises an intake air temperature sensor for detecting an intake air temperature taken into said engine.

20. An apparatus according to claim 18, wherein said engine condition detecting means comprises an atmospheric pressure sensor for detecting an atmospheric pressure.

21. An engine control method for a vehicle, comprising the steps of:
- setting a target output of an engine in accordance with an operation condition of a vehicle;
- converting the target output into a target air intake amount of said engine;
- correcting the target intake air amount in accordance with the operation condition of said engine;
- converting the target intake air amount into a target opening of a throttle valve provided to an intake path of said engine;
- correcting the target opening in accordance with a deviation between an actual intake air amount of said engine and the corrected target intake air amount; and
- open/close-controlling said throttle valve in accordance with the corrected target opening.

22. A method according to claim 21, wherein the operation condition of the vehicle includes a slip value of a drive wheel.

23. A method according to claim 21, wherein the operation condition of the engine includes an intake air temperature taken into said engine.

24. A method according to claim 21, wherein the operation condition of the engine includes an atmospheric pressure.

25. An engine output control apparatus for a vehicle, comprising:
- operation condition detecting means for detecting an operation condition of the vehicle;
- target output setting means for setting a target output of an engine of the vehicle in accordance with the detection result of said operation condition detecting means;
- target intake air amount setting means for setting a target intake air amount of said engine in accordance with the target output set by said target output setting means;

engine condition detecting means for detecting an operation condition of said engine;

target intake air amount correcting means for correcting the target intake air amount set by said target intake air amount setting means in accordance with the detection result of said engine condition detecting means to set a corrected target intake air amount;

a throttle valve arranged in an intake path of said engine;

target opening setting means for setting a target opening of said throttle valve on the basis of the corrected target intake air amount set by said target intake air amount correcting means;

intake air amount detecting means for detecting an actual intake air amount of said engine;

intake air amount deviation calculating means for calculating a deviation between the corrected target intake air amount set by said target intake air amount correcting means and the actual intake air amount detected by said intake air amount detecting means;

opening correction value setting means for setting an opening correction value of the target opening set by said target opening setting means in accordance with the deviation calculated by said intake air amount deviation calculating means; and throttle valve controlling means for open/close-controlling said throttle valve in accordance with the target opening set by said target opening setting means and the opening correction value set by said opening correction value setting means.

26. An apparatus according to claim 25, wherein said operation condition detecting means detects a slip value of a drive wheel.

27. An apparatus according to claim 25, wherein said engine condition detecting means comprises an intake air temperature sensor for detecting an intake air temperature taken into said engine.

28. An apparatus according to claim 25, wherein said engine condition detecting means comprises an atmospheric pressure sensor for detecting an atmospheric pressure.

* * * * *